(12) United States Patent
Hashimoto et al.

(10) Patent No.: US 9,065,150 B2
(45) Date of Patent: Jun. 23, 2015

(54) ELECTROLYTE MATERIAL, AND BATTERY MATERIAL AND SECONDARY BATTERY USING SAID ELECTROLYTE MATERIAL

(75) Inventors: Masashi Hashimoto, Suita (JP); Akane Oguro, Suita (JP); Naohiko Itayama, Suita (JP); Kazuo Takei, Suita (JP); Izuho Okada, Osaka (JP)

(73) Assignee: Nippon Shokubai Co., Ltd., Osaka (JP)

( * ) Notice: Subject to any disclaimer, the term of this patent is extended or adjusted under 35 U.S.C. 154(b) by 22 days.

(21) Appl. No.: 13/514,522

(22) PCT Filed: Dec. 9, 2010

(86) PCT No.: PCT/JP2010/072095
§ 371 (c)(1),
(2), (4) Date: Jun. 7, 2012

(87) PCT Pub. No.: WO2011/071101
PCT Pub. Date: Jun. 16, 2011

(65) Prior Publication Data
US 2012/0244427 A1   Sep. 27, 2012

(30) Foreign Application Priority Data

Dec. 9, 2009   (JP) .................................. 2009-279748

(51) Int. Cl.
| | | |
|---|---|---|
| *H01M 10/00* | (2006.01) | |
| *H01M 10/0565* | (2010.01) | |
| *C08F 16/14* | (2006.01) | |
| *C08K 5/42* | (2006.01) | |
| *C08K 5/43* | (2006.01) | |
| *C08K 5/55* | (2006.01) | |
| *C08F 216/14* | (2006.01) | |
| *H01M 10/0568* | (2010.01) | |

(52) U.S. Cl.
CPC ........... *H01M 10/0565* (2013.01); *C08F 16/14* (2013.01); *C08F 2216/1433* (2013.01); *C08K 5/42* (2013.01); *C08K 5/43* (2013.01); *C08K 5/55* (2013.01); *H01M 10/0568* (2013.01); *H01M 2300/0082* (2013.01); *H01M 2300/0085* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 4,886,716 A | 12/1989 | Roggero et al. | |
| 5,173,205 A | 12/1992 | Marchese et al. | |
| 5,264,307 A * | 11/1993 | Andrei et al. | ................. 429/317 |
| 5,417,870 A | 5/1995 | Andrei et al. | |
| 5,741,610 A | 4/1998 | Andrei et al. | |
| 5,873,915 A | 2/1999 | Andrei et al. | |
| 6,277,514 B1 * | 8/2001 | Ying et al. | ..................... 429/129 |
| 6,509,122 B1 | 1/2003 | Oyama | |
| 6,524,498 B1 | 2/2003 | Hata et al. | |
| 6,533,964 B1 | 3/2003 | Hata et al. | |
| 6,537,468 B1 | 3/2003 | Hata et al. | |
| 2002/0094481 A1 | 7/2002 | Goto et al. | |
| 2003/0082458 A1 | 5/2003 | Oyama | |
| 2005/0175903 A1 * | 8/2005 | Kim et al. | ...................... 429/246 |
| 2006/0068294 A1 * | 3/2006 | Mraz et al. | .................... 429/302 |
| 2008/0206647 A1 | 8/2008 | Katsuyama et al. | |
| 2009/0053602 A1 * | 2/2009 | Sakitani et al. | ............... 429/213 |
| 2010/0040954 A1 * | 2/2010 | Amine et al. | .................. 429/322 |

FOREIGN PATENT DOCUMENTS

| | | |
|---|---|---|
| JP | 1-135856 | 5/1989 |
| JP | 03-024162 A | 2/1991 |
| JP | 03-024163 A | 2/1991 |
| JP | 03-024164 A | 2/1991 |
| JP | 04-335011 A | 11/1992 |
| JP | 09-180706 A | 7/1997 |
| JP | 2699280 | 9/1997 |
| JP | 10-208542 A | 8/1998 |
| JP | 10208542 A * | 8/1998 |
| JP | 2001-028276 A | 1/2001 |
| JP | 2001-189166 A | 7/2001 |
| JP | 2002-117844 A | 4/2002 |
| JP | P4076639 | 2/2008 |
| JP | 2008-218404 A | 9/2008 |
| JP | 2008-231408 A | 10/2008 |
| WO | WO-99/64484 A1 | 12/1999 |
| WO | WO 9964484 A1 * | 12/1999 |
| WO | WO-00/56815 A1 | 9/2000 |
| WO | WO 2007091867 A1 * | 8/2007 |

* cited by examiner

*Primary Examiner* — Ula C Ruddock
*Assistant Examiner* — Scott J Chmielecki
(74) *Attorney, Agent, or Firm* — Novak Druce Connolly Bove + Quigg LLP

(57) ABSTRACT

The present invention provides a stable electrolyte material that provides high safety, exhibits favorable ionic conductivity not only at room temperature but also in the low temperature range at or below room temperature, has excellent reduction resistance, and can be suitably used as a material of a lithium ion cell. The electrolyte material includes, as essential components, a specific polymer having an ether bond in a side chain thereof, and a specific electrolyte salt.

24 Claims, No Drawings

ELECTROLYTE MATERIAL, AND BATTERY MATERIAL AND SECONDARY BATTERY USING SAID ELECTROLYTE MATERIAL

CROSS REFERENCE TO RELATED APPLICATIONS

This application is a National Phase filing under 35 U.S.C. §371 of PCT/JP2010/072095 filed on Dec. 9, 2010; which in turn claims priority to Application No. 2009-279748 filed in Japan on Dec. 9, 2009, under 35 U.S.C. §119; the entire contents of all are hereby incorporated by reference.

TECHNICAL FIELD

The present invention relates to an electrolyte material. More specifically, the present invention relates to an electrolyte material that can be suitably used as an electrolyte or a binder for a lithium ion cell or the like.

BACKGROUND ART

In recent years, there has been a growing concern about environmental issues, which has led to a progress in conversion of the energy resources from fossil fuels such as petroleum and coal to alternative energy resources. Among these alternative energy resources, cells have been focused. Particularly, secondary cells which can be repeatedly charged and discharged are more used not only for electronic devices such as cell phones and laptops but also in other various fields such as cars and aircraft, and thus various secondary cells and the materials used for secondary cells have been researched and developed. Particularly, large-volume, light-weight lithium ion cells are a secondary cell the use of which is most expected to be expanded and are a cell that is most actively researched and developed.

As to a material used for such a secondary cell, the following compounds have been disclosed. Patent Literature 1, for example, discloses an ethylene oxide copolymer with a specified crystallization temperature and a glass transition temperature; and a polymer composition that contains an ethylene oxide copolymer and an organic metal salt. Patent Literature 2, for example, discloses a nonaqueous electrolyte obtained by dissolving an electrolyte in a nonaqueous solvent that contains 0.05 to 30 wt % of a polyalkylene glycol derivative with a specific structure. Patent Literature 3, for example, discloses a solid polyelectrolyte constituted by a solid solution of an ionic compound in a solid cross-linked polyether that is obtained by copolymerizing a vinyl ether having a specific structure and a divinyl ether having a specific structure and has a specific weight average molecular weight and a specific glass transition temperature. Patent Literature 4, for example, discloses the following ionic conductive materials each of which contains a polymeric acid lithium salt with a specific Li equivalent weight, and has a specific minimum pKa when both ends of a repeated structure of the polymeric acid lithium salt are replaced with methyl groups and lithium cations of the polymeric acid lithium salt are replaced with protons: namely, an ionic conductive material having a structure in which the lithium salt is in a side chain, and the main chain and the lithium salt in a side chain are bonded via a carboxyl group or a carbonyl group; an ionic conductive material having a structure in which a hydrocarbon group is in a side chain having lithium sulfonate at an end; and an ionic conductive material having a structure in which lithium carbonate or lithium sulfonate is directly bonded to the main chain. Patent Literatures 5 to 7, for example, each disclose a polymer solid electrolyte that contains an alkali metal salt and a comb polymer obtained by reacting a polyether having a reactive double bond with a structure that has a polyether diol in which hydrogen of a hydroxyl group at one end is replaced by a methyl or ethyl group, and hydrogen of a hydroxyl group at the other end is replaced by a double bond. Patent Literature 8, for example, discloses a solid, polymeric electrolyte in a membrane form, constituted by a solid solution of an ionic compound in a crosslinked polyether.

CITATION LIST

Patent Literature

Patent Literature 1: JP 2008-231408 A (pp. 1 and 2)
Patent Literature 2: JP 4076639 B (p. 1)
Patent Literature 3: JP 2699280 B (p. 1)
Patent Literature 4: JP 2008-218404 A (pp. 1 and 2)
Patent Literature 5: JP 3-24162 A (p. 1)
Patent Literature 6: JP 3-24163 A (p. 1)
Patent Literature 7: JP 3-24164 A (p. 1)
Patent Literature 8: U.S. Pat. No. 5,417,870

SUMMARY OF INVENTION

Technical Problem

As above, various studies have been made on materials that have properties required for cells, such as ionic conductivity. Regarding electrolytes, liquid ones cause an abnormal reaction in the interface with an electrode in some cases, and thus safety issues remain. Also, among those cells, lithium ion cells containing a lithium compound in the negative electrode show high reducibility of the negative electrode, and thus materials therefor are required to have reduction resistance high enough for use of a lithium negative electrode. Further, secondary cells including lithium ion cells are expected to be used in various fields under various conditions for use. Accordingly, those secondary cells are required to exhibit high ionic conductivity at temperatures around room temperature and exhibit ionic conductivity not only at room temperature but also at low temperatures. However, polyethylene glycols, widely considered as electrolytes of secondary cells today, have a high melting point, and are therefore crystallized at low temperatures, which means that there is a limit on ionic conductivity at low temperatures. In this regard, none of the techniques of the above Patent Literatures 1 to 8 has been made in consideration of the ionic conductivity at low temperatures. Actually, the techniques of Patent Literatures 1 to 8 are not sufficient in terms of the ionic conductivity at temperatures other than low temperatures, either. Patent Literatures 6, 7, and 8 each disclose an example showing high ionic conductivity at 25°; here, the high ionic conductivities are due to the plasticizers and polar solvents contained, and thus the values do not show that the ionic conductivity of the polymer is high. Accordingly, these electrolyte materials can be further improved in terms of high safety and favorable cell properties at wide temperatures including low temperatures.

The present invention has been made in view of the above state of the art, and aims to provide a stable electrolyte material that provides high safety, exhibits favorable ionic conductivity not only at room temperature but also in the low temperature range at or below room temperature, has excellent reduction resistance, and is suitably used as a material for a lithium ion cell.

Solution to Problem

The present inventors have made various studies on solid electrolyte materials that do not easily cause an abnormal reaction in the electrode interface and is highly safe compared with liquid electrolyte materials, and that show favorable ionic conductivity even at room temperature and lower temperatures. As a result, an electrolyte material containing a combination of a specific polymer and a specific ionic compound as an electrolyte salt has been found to be better in lithium ionic conductivity and reduction resistance, and thus to be suitably used as a material for cells such as lithium ion cells. Here, the specific polymer is a polymer derived from a monomer with a structure in which an oxyalkylene structure is bonded to a structure containing a double bond of carbon atoms via an ether bond, and shows excellent lithium ionic conductivity owing to the oxyalkylene structure, and excellent reduction resistance owing to the structure in which the oxyalkylene structure is bonded to the main chain of the polymer via an ether bond. Also, the polymer contained in the electrolyte material can show excellent ionic conductivity at temperatures around room temperature (10° C. to 30° C.), and can also show ionic conductivity at low temperatures of −20° C. to 0° C. at which polyethylene glycols freeze to not be able to show ionic conductivity. The polymer has been found to be able to show excellent ionic conductivity at such low temperatures in the case that the number of repetition of oxyalkylene units is set to a value in a specific range in a monomer having the structure in which the oxyalkylene structure is bonded to a structure containing a double bond of carbon atoms via an ether bond. Also, a polymer having such a specific structure has been found to be suitably used as a component of an electrolyte material that is highly safe and shows excellent properties because the polymer sufficiently suppresses an abnormal reaction in the electrode interface. Thereby, the above problem has been admirably solved, and the present invention has been completed.

That is, one aspect of the present invention is an electrolyte material including, as essential components thereof, a polymer having an ether bond in a side chain thereof, and an electrolyte salt, the polymer including a polymer derived from a monomer component that includes a monomer represented by the following formula (1):

[Chem. 1]

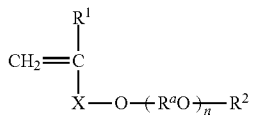

(1)

wherein $R^1$ represents a hydrogen atom or a methyl group; X represents a methylene group or a direct bond; $R^a(s)$ are the same as or different from each other, each representing a C1 to C4 linear or branched hydrocarbon group; $R^2$ represents a C1 to C18 linear, branched, or cyclic hydrocarbon group; and n represents an average number of added moles of a group represented by $R^aO$, the electrolyte salt including an ionic compound that includes an alkali metal cation and at least one anion selected from the group consisting of $PF_6^-$, $BF_4^-$, $CF_3SO_3^-$, tetracyanoborate, and $R^3SO_2N^-SO_2R^4$ wherein $R^3$ and $R^4$ are the same as or different from each other, each representing either F, $CF_3$, or $C_2F_5$.

Hereinafter, the present invention will be described in detail.

The electrolyte material of the present invention contains a polymer having an ether bond in a side chain and an electrolyte salt as its essential components, and may contain other components as long as it contains an electrolyte salt and a polymer having an ether bond in a side chain.

The polymer having an ether bond in a side chain include a polymer obtained by polymerizing a monomer component including a monomer represented by the following formula (1):

[Chem. 2]

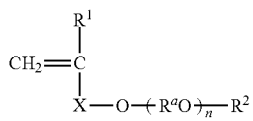

(1)

wherein $R^1$ represents a hydrogen atom or a methyl group; X represents a methylene group or a direct bond; $R^a$ represents a C1 to C4 linear or branched hydrocarbon group, and $R^a$s are the same as or different from each other; $R^2$ represents a C1 to C18 linear, branched, or cyclic hydrocarbon group; and n represents an average number of added moles of a group represented by $R^aO$. The polymer containing such a monomer unit has oxyalkylene units bonded via an ether bond in side chains. A polymer having such a structure can show favorable ionic conductivity owing to the oxyalkylene units contained, and show ionic conductivity even at room temperature and lower temperatures. In the case that the polymer has a carbonyl unit in the structure, the interaction with lithium is very high, and thus the ionic conductivity is decreased. The interaction can be moderately inhibited in the case that the polymer is derived from monomers such as a monomer represented by formula (1) which has ether-bonded functional groups formed from oxyalkylene units via an ether bond. As a result, the polymer can be suitably used as a material for a lithium ion cell.

The monomer component for obtaining the polymer in the electrolyte material of the present invention may include one species of monomer represented by formula (1), or may contain two or more species of the monomer. As long as the electrolyte material of the present invention contains a polymer derived from a monomer component including the monomer represented by formula (1), the electrolyte material may also contain a polymer having any other structure and having ether-bonded units in a side chain.

Examples of the C1 to C4 linear or branched hydrocarbon group represented by $R^a$ in formula (1) include linear alkylene groups such as methylene (—$CH_2$—), ethylene (—$CH_2CH_2$—), trimethylene (—$CH_2CH_2CH_2$—), and tetramethylene (—$CH_2CH_2CH_2CH_2$—); and branched alkylene groups such as ethylidene [—$CH(CH_3)$—], propylene [—$CH(CH_3)CH_2$—], propylidene [—$CH(CH_3CH_2)$—], and isopropylidene [—$C(CH_3)_2$—].

Among these, methylene, ethylene, trimethylene, and tetramethylene mentioned as the linear alkylene groups, and propylene and propylidene mentioned as the branched alkylene groups are preferred. More preferred are ethylene, trimethylene, tetramethylene, propylene, and propylidene.

In formula (1), $R^a(s)$ may be of one species or two or more species. In the case that $R^a$s are of two or more species, the addition form of oxyalkylene groups represented by —($R^aO$)— may be any form such as block addition and random addition.

The value of n representing an average number of added moles for the group represented by $R^aO$ in formula (1) is in the range of 1 to 50 although it can differ depending on the oxyalkylene group constituting the group represented by $R^aO$. In the case that the average number of repetition of oxyalkylene units is any one of 1 to 50, the crystallization temperature of the polymer is lower, and the ionic conductivity at room temperature and lower temperatures are more favorably achieved. An average number of repetitions of more than 50 leads to problems such as a larger influence of the polyether units which causes the polymer to be easily crystallized. The value of n is more preferably any one of 2 to 30, still more preferably any one of 4 to 30, and most preferably any one of 6 to 30. Particularly in the case that the groups represented by $R^aO$ is an oxyethylene group, n is more preferably any one of 2 to 30, still more preferably any one of 4 to 20, and most preferably any one of 6 to 14.

In this way, a somewhat large average number of repetitions of the oxyalkylene units results in even better ionic conductivity of the polymer at room temperature and lower temperatures. This is an unexpected effect in that the even better ionic conductivity is achieved although a larger average number of repetitions of the oxyalkylene units in the polymer is expected to cause the oxyalkylene units to affect the physical properties of the polymer more such that the polymer freezes at low temperatures, and thus the properties decrease.

Examples of the C1 to C18 linear, branched, or cyclic hydrocarbon groups represented by $R^2$ in formula (1) include C1 to C18 aliphatic or alicyclic alkyl groups such as methyl, ethyl, n-propyl, isopropyl, n-butyl, n-hexyl, n-octyl, isobutyl, sec-butyl, tert-butyl, cyclopropyl, cyclobutyl, cyclopentyl, and cyclohexyl; $C_6$ to $C_{18}$ aryl groups such as phenyl, naphthyl, anthryl, and phenanthryl; alkyl-substituted aryl groups such as o-, m- or p-tolyl, 2,3- or 2,4-xylyl, and mesityl; (alkyl)phenyl-substituted aryl groups such as biphenylyl; and aryl-substituted alkyl groups such as benzyl, phenethyl, benzhydryl, and trityl.

A larger carbon number of $R^2$ decreases the glass transition temperature of the polymer to be obtained, but is not preferred because the hydrophobicity increases. Among these, C1 to C8 aliphatic groups such as methyl, ethyl, n-propyl, isopropyl, n-butyl, n-hexyl, n-octyl, isobutyl, sec-butyl, and tert-butyl are preferred, and methyl, ethyl, n-propyl, isopropyl, n-butyl, n-hexyl, and n-octyl are more preferred.

Here, for an increase in the dielectric constant of the polymer, it is effective to include polar substituents such as carbonate groups and ester groups in $R^2$.

The monomer represented by formula (1) is a vinyl ether monomer in the case that X in formula (1) is a direct bond, and the monomer represented by formula (1) is a (meth)allyl monomer in the case that X in formula (1) is a methylene group. A monomer having any one of these structures can exhibit the above characteristics, and can be suitably used as a monomer component of the polymer used for an electrolyte material. That is, one preferred embodiment of the present invention is that X in formula (1) is a direct bond. Further, another preferred embodiment of the present invention is that X in formula (1) is a methylene group.

Examples of the method for producing the monomer represented by formula (1) include, but not particularly limited to, a method of reacting a halide including a vinyl ether group or a (meth)allyl group, and a compound obtained by replacing hydrogen of the hydroxyl group at one end of a polyetherdiol by a hydrocarbon group, via dechlorination in the presence of a basic compound. Also, a method for producing a monomer in which X in formula (1) is a direct bond may include, for example, a method of intramolecularly dehydrating a compound obtained by replacing hydrogen of the hydroxyl group at one end of a polyetherdiol by a hydrocarbon group, in the presence of a basic catalyst. In addition, in the case of producing a monomer with a large value of n in formula (1), i.e., a large number of repetitions of the oxyalkylene units, the method may include, for example, adding, in the presence of an addition reaction catalyst, an alkylene oxide to the compound obtained by replacing hydrogen of the hydroxyl group at one end of a polyetherdiol having a small number of repetitions of the oxyalkylene units by a vinyl ether group or a (meth)allyl group; and reacting the resulting adduct and an alkyl halide via dechlorination in the presence of a basic compound.

The basic compound that causes dechlorination reaction is not particularly limited, and specific examples thereof include alkaline (earth) metal hydroxides such as lithium hydroxide, sodium hydroxide, potassium hydroxide, cesium hydroxide, magnesium hydroxide, and calcium hydroxide. Examples of the basic catalyst used for intramolecular dehydration include the above-mentioned alkaline (earth) metal hydroxides; alkaline (earth) metal carbonates such as lithium hydrogencarbonate, sodium hydrogencarbonate, potassium hydrogencarbonate, caesium hydrogencarbonate, magnesium hydrogencarbonate, calcium hydrogencarbonate, lithium carbonate, sodium carbonate, potassium carbonate, cesium carbonate, magnesium carbonate, and calcium carbonate; alkaline (earth) metal carboxylates such as lithium acetate, sodium acetate, potassium acetate, cesium acetate, magnesium acetate, and calcium acetate; alkaline (earth) metal alkoxides such as sodium methoxide, sodium ethoxide, sodium butoxide, potassium methoxide, potassium ethoxide, and potassium butoxide; and amines such as ammonia, methylamine, ethylamine, butylamine, ethanolamine, dimethylamine, diethylamine, dibutylamine, diethanolamine, trimethylamine, triethylamine, tributylamine, tris(2-ethylhexyl)amine, triethanolamine, ethylenediamine, tetramethylethylenediamine, threne, 1,4-diazabicyclo[2,2,2] octane, aniline, methylaniline, dimethylaniline, pyridine, piperidine, picoline, N,N-dimethyl-p-toluidine, lutidine, quinoline, isoquinoline, and collidine.

Examples of the addition reaction catalyst include metal hydroxides such as sodium hydroxide, potassium hydroxide, lithium hydroxide, and magnesium hydroxide; metal hydrides such as sodium hydride and potassium hydride; organometal compounds such as butyllithium, methyllithium, and phenyllithium; Lewis acids such as boron trifluoride and titanium tetrachloride; and metal alkoxides such as sodium methoxide and potassium methoxide.

The amounts of the basic compound, the basic catalyst, and the addition reaction catalyst used can be suitably set according to conditions such as the amount of reaction raw materials.

The polymer used in the present invention is derived from the monomer component including the monomer represented by formula (1). Here, the monomer component may include other monomer(s) copolymerizable with the monomer represented by formula (1), and it is preferable that the monomer component include other monomer(s) in the case that the monomer represented by formula (1) is a vinyl ether monomer.

Examples of the other monomer(s) include the following radically copolymerizable compounds: (meth)acrylates such as methyl(meth)acrylate, ethyl(meth)acrylate, butyl(meth)acrylate, 2-ethylhexyl(meth)acrylate, cyclohexyl(meth)acrylate, phenyl(meth)acrylate, benzyl(meth)acrylate, dicyclopentanyl(meth)acrylate, isobornyl(meth)acrylate, 2-(acetoacetoxy)ethyl(meth)acrylate, and (meth)acrylic acid; hydroxyl group-containing (meth)acrylates such as 2-hydroxyethyl(meth)acrylate, 2-hydroxypropyl(meth)acrylate, 3-hydroxypropyl(meth)acrylate, 4-hydroxybutyl(meth)

acrylate, methyl(α-hydroxymethyl)acrylate, ethyl(α-hydroxymethyl)acrylate, caprolactone-modified hydroxy (meth)acrylate, and 4-hydroxymethyl cyclohexyl methyl (meth)acrylate; acidic functional group-containing polymerizable monomers such as acrylic acid, methacrylic acid, maleic acid, fumaric acid, crotonic acid, itaconic acid, maleic anhydride, carboxyl group-terminated caprolactone-modified (meth)acrylate, sulfoethyl(meth)acrylate, and 2-(meth)acryloyloxy ethyl acid phosphate; vinyl compounds such as styrene, α-methylstyrene, vinyltoluene, divinylbenzene, vinyl acetate, vinyl chloride, and vinylidene chloride; silicon-containing polymerizable monomers such as vinyl trichlorosilane, vinyl tris(β-methoxyethoxy)silane, and vinyltriethoxysilane; halogen-containing (meth)acrylates such as trifluoroethyl (meth)acrylate, octafluoropentyl(meth) acrylate, hepta-dodeca fluorodecyl(meth)acrylate, and perfluorooctylethyl (meth)acrylate; nitrogen-containing polymerizable monomers such as (meth)acrylamide, N,N-dimethylaminopropyl (meth) acrylamide, N-isopropyl(meth) acrylamide, N-methylol (meth) acrylamide, N,N'-dimethylaminoethyl(meth)acrylate, N-methyl-N-vinylformamide, N-vinylpyridine, N-vinylimidazole, N-vinylpyrrolidone, N-phenylmaleimide, N-cyclohexyl maleimide, and 2-isopropenyl-2-oxazoline; polyfunctional polymerizable monomers such as ethylene glycol di(meth)acrylate, diethylene glycol di(meth)acrylate, triethylene glycol di(meth)acrylate, polyethylene glycol di(meth)acrylate, 1,4-butanediol di(meth) acrylate, 1,6-hexanediol di(meth)acrylate, polypropylene glycol di(meth)acrylate, pentaerythritol tri(meth)acrylate, vinyloxyethyl(meth)acrylate, and vinyloxyethoxyethyl (meth)acrylate; epoxy group-containing polymerizable monomers such as glycidyl(meth)acrylate, α-methylglycidyl (meth)acrylate, and 3,4-epoxycyclohexylmethyl(meth)acrylate; isocyanato group-containing polymerizable monomers such as 2-(meth)acryloyloxy ethylisocyanate, (meth)acryloyl isocyanate, and m-isopropenyl-α,α-dimethylbenzyl isocyanate; and ultraviolet-stable polymerizable monomers such as 4-(meth)acryloyloxy-2,2,6,6-tetramethylpiperidine, and 1-(meth)acryloyl-4-cyano-4-(meth)acryloylamino-2,2,6,6-tetramethylpiperidine. Any one of these or any two or more of these may be used.

The examples of the other monomer(s) also include the following cationically copolymerizable compounds: monofunctional vinyl ethers such as methyl vinyl ether, ethyl vinyl ether, propyl vinyl ether, butyl vinyl ether, 2-ethylhexyl vinyl ether, n-nonyl vinyl ether, cyclohexyl vinyl ether, methoxyethyl vinyl ether, ethoxyethyl vinyl ether, methoxyethoxy ethyl vinyl ether, ethoxy ethoxyethyl vinyl ether, methoxy polyethylene glycol vinyl ether, 2-hydroxyethyl vinyl ether, 4-hydroxybutyl vinyl ether, diethylene glycol monovinyl ether, polyethylene glycol monovinyl ether, and chloroethyl vinyl ether; monofunctional vinyl compounds such as styrene, α-methylstyrene, vinyl toluene, allyl acetate, vinyl acetate, vinyl propionate, and vinyl benzoate; monofunctional epoxy compounds such as methyl glycidyl ether, ethyl glycidyl ether, butyl glycidyl ether, 2-ethylhexyl glycidyl ether, lauryl glycidyl ether, cyclohexyl glycidyl ether, methoxyethyl glycidyl ether, ethoxyethyl glycidyl ether, methoxyethoxy ethyl glycidyl ether, ethoxy ethoxyethyl glycidyl ether, and methoxy polyethylene glycol glycidyl ether; monofunctional alicyclic ether compounds such as 3-methyl-3-hydroxymethyloxetane, 3-ethyl-3-hydroxymethyloxetane, 3-methyl-3-phenoxymethyloxetane, 3-ethyl-3-phenoxymethyloxetane, 3-methyl-3-(2-ethylhexyloxymethyl)oxetane, and 3-ethyl-3-(2-ethylhexyloxymethyl)oxetane; polyfunctional vinyl ethers such as ethylene glycol divinyl ether, diethylene glycol divinyl ether, polyethylene glycol divinyl ether, propylene glycol divinyl ether, butylene glycol divinyl ether, and hexanediol divinyl ether; polyfunctional vinyl compounds such as divinylbenzene; polyfunctional epoxy compounds such as ethylene glycol diglycidyl ether, diethylene glycol diglycidyl ether, polyethylene glycol diglycidyl ether, and propylene glycol diglycidyl ether; polyfunctional alicyclic ether compounds such as di[1-methyl(3-oxetanyl)]methyl ether, di[1-ethyl(3-oxetanyl)]methyl ether, 1,4-bis{[(3-methyl-3-oxetanyl)methoxy]methyl}benzene, 1,4-bis{[(3-ethyl-3-oxetanyl)methoxy]methyl}benzene, bis{4-[(3-methyl-3-oxetanyl)methoxy]methyl}benzyl ether, and bis{4-[(3-ethyl-3-oxetanyl)methoxy]methyl}benzyl ether; and cyclic ethers such as ethylene oxide, propylene oxide, butylene oxide, and tetrahydrofuran. Any one of these or any two or more of these may be used.

Preferred among the above other monomer(s) are polyfunctional monomers. In the case that the monomer component includes a polyfunctional monomer, the polymer to be obtained has a cross-linkable functional group in its molecule. Such a polymer having a cross-linkable functional group in its molecule can be suitably used as-is as a component of an electrolyte material; still, the polymer can be better in the properties such as curability and film-forming properties in the case of having a cross-linkable structure.

That is, yet another preferred embodiment of the present invention is that the polymer used in the present invention is a cross-linkable polymer having a cross-linkable functional group in its molecule.

Also, in the case that the monomer component of the polymer used in the present invention includes a polyfunctional monomer and a monomer represented by formula (1) having a large average number of repetitions of the oxyalkylene units, then the polymer to be obtained can exhibit especially favorable ionic conductivity, and can exhibit high ionic conductivity even at room temperature and lower temperatures. That is, yet another aspect of the present invention is an electrolyte material that includes a polymer having an ether bond in a side chain, wherein the polymer includes a polymer derived from a monomer component including the monomer represented by formula (1), n in formula (1) is any one of 6 to 30, and the polymer is a cross-linkable polymer having a cross-linkable functional group in its molecule.

Particularly preferred among the other monomer(s) are vinyl ether group-containing (meth)acrylates such as vinyloxyethyl(meth)acrylate and vinyloxyethoxyethyl (meth) acrylate. Most preferred is vinyloxyethoxyethyl acrylate.

In this way, yet another preferred embodiment of the present invention is that the above cross-linkable polymer is a polymer derived from the monomer component further including a vinyl ether group-containing (meth)acrylate.

Also, yet another aspect of the present invention is an electrolyte material that includes a polymer having an ether bond in a side chain, wherein the polymer includes a polymer derived from a monomer component that includes the monomer represented by formula (1) and vinyloxy ethoxyethyl acrylate.

The polymer included in the electrolyte material of the present invention is preferably one having a cross-linkable structure. Inclusion of a cross-linkable structure leads to even better properties of curability and film-forming properties as described above. The polymer having a cross-linkable structure is not particularly limited as long as a cross-linkable structure is included. Still, the polymer is preferably one obtained by reacting the cross-linkable functional group in such a polymer having a cross-linkable functional group in its molecule so as to give a cross-linked structure.

That is, yet another preferred embodiment of the present invention is that the electrolyte material includes a cross-linked polymer that is obtained by reacting the cross-linkable functional group in the molecule of the polymer.

The "electrolyte material" in the present invention encompasses electrolyte materials that contain the following respective polymers in the case that the polymer (a component) having an ether bond in a side chain is a polymer having a cross-linkable functional group in a molecule thereof: namely, a polymer having a cross-linkable functional group in a molecule before cross-linking of the polymer; and a polymer (cross-linked polymer) having a cross-linked structure after completion of cross-linking of the polymer. Of these electrolyte materials, an electrolyte material containing a polymer with a cross-linkable functional group in a molecule before cross-linking of the polymer may be referred to as an "electrolyte material raw composition", and an electrolyte material containing a polymer with a cross-linked structure after completion of cross-linking of the polymer may be referred to as an "electrolyte material" so that they can be distinguished from each other.

In the case that the monomer component includes other monomer(s), the proportion of the monomer represented by formula (1) is preferably 10% by mass or higher and 99.9% by mass or lower in 100% by mass of the total monomer component. The proportion of the monomer represented by formula (1) in the above range produces a polymer which is a material having excellent ionic conductivity and exhibiting ionic conductivity even at low temperatures. The proportion is more preferably 30% by mass or higher and 99.9% by mass or lower, and more preferably 50% by mass or higher and 99.9% by mass or lower.

In the case that the other monomer(s) in the monomer component include(s) a polyfunctional monomer, the proportion of the polyfunctional monomer is preferably 0.1% by mass or higher and 90% by mass or lower in 100% by mass of the total monomer component. The proportion of the polyfunctional polymer in the above range produces a polymer which is a material having excellent ionic conductivity. The proportion is more preferably 0.1% by mass or higher and 70% by mass or lower, and more preferably 0.1% by mass or higher and 50% by mass or lower.

The weight average molecular weight of the polymer in the present invention is preferably 2,000,000 or less. The weight average molecular weight of the polymer in such a range gives a viscosity at which handling is easy. The weight average molecular weight is more preferably 500,000 or less, still more preferably 400 to 200,000, and particularly preferably 500 to 100,000. The weight average molecular weight can be determined by GPC (gel permeation chromatography) under the following measurement conditions, for example.

Measuring equipment: HLC-8120
Molecular-weight column: G5000HXL and GMHXL-L (products of Tosoh Corp.) connected in series
Eluate: tetrahydrofuran
Calibration curve reference material: polystyrene
Measuring method: the measurement object is dissolved in an eluate to a solid content of 0.3% by mass, and the resulting solution is filtered with a filter.

The glass transition temperature (Tg) of the polymer is preferably 20° C. or lower and −150° C. or higher. The glass transition temperature in such a range produces a polymer capable of exhibiting ionic conductivity even at low temperatures of 0° C. and lower, and thus enables the electrolyte material to exhibit ionic conductivity at a wide range of temperatures. The grass transition temperature is more preferably −40° C. or lower, and still more preferably −60° C. or lower.

The glass transition temperature of the polymer may be determined based on the already acquired knowledge, or may be controlled in accordance with the monomer species in the monomer component and the proportions of the monomer species; still, theoretically, the glass transition temperature is calculated from the following formula.

$$\frac{1}{Tg'} = \left[\frac{W_1'}{T_1} + \frac{W_2'}{T_2} + \ldots + \frac{W_n'}{T_n}\right]$$ [Math 1]

In the formula, Tg' is Tg (absolute temperature) of the copolymer. $W_1'$, $W_2'$, and so forth to $W_n'$ are mass fractions of the respective monomers in the total monomer component. $T_1$, $T_2$, and so forth to $T_n$ are glass transition temperatures (absolute temperatures) of the homopolymers derived from the respective monomers.

The crystallization temperature of the polymer depends on the weight average molecular weight of the polymer, and can be adjusted by changing the average number of added moles of the oxyalkylene groups in the monomer represented by formula (1). In the case that the monomer component includes monomer(s) other than the monomer represented by formula (1), the crystallization temperature can be adjusted by increasing the proportion of the other monomer(s). The polymer is most preferably in an amorphous state.

In the case that the polymer having an ether bond in a side chain thereof in the electrolyte material of the present invention is a polymer having a cross-linkable functional group in a molecule, it is preferable to produce a prepolymer and cross-link the prepolymer to produce a polymer having a cross-linked structure. A polymer having a cross-linked structure produced by such a method has an advantage in terms of processability, such as favorable film-forming properties and formation of a favorable interface with a negative electrode.

The polymer used in the present invention can be synthesized by the following polymerization methods. The following polymerization methods can be employed not only for the above-mentioned polymer having a cross-linked structure obtained by forming a cross-linked structure from the produced prepolymer but for all the polymers used in the present invention.

(1) Radical Polymerization

For polymerization of the monomer component, a polymerization initiator can be used. Examples of the radical polymerization initiator include, but not limited to, 2,2'-azobis-(2-methylbutyronitrile), tert-butylperoxy-2-ethylhexanoate, 2,2'-azobisisobutyronitrile, benzoyl peroxide, and di-tert-butyl peroxide. Each of these polymerization initiators may be used alone, or two or more of these may be used in combination. The amount of the polymerization initiator may be appropriately set in accordance with the desired physical properties of the acrylic polymer to be obtained or the like. Usually, the amount is preferably 0.01 to 50% by mass, and more preferably 0.05 to 20% by mass based on 100% by mass of the monomer component.

The polymerization conditions in polymerization of the monomer component are not particularly limited, and may be appropriately set in accordance with the polymerization method. The polymerization temperature is preferably room temperature (25° C.) to 200° C., and more preferably room temperature (25° C.) to 140° C. The reaction time may be appropriately set such that the polymerization reaction of the monomer component can be completed.

(2) Cationic Polymerization

Cationic polymerization can be performed by a method usually used. Examples of the cationic polymerization initiator include proton acids such as a heteropolyacid, a thermal-latent cationic polymerization initiator, perchloric acid, sulfuric acid, phosphoric acid, para-toluenesulfonic acid, picrylsulfonic acid, trifluoromethanesulfonic acid, trichloroacetic acid, and trifluoroacetic acid; Lewis acids such as boron trifluoride, aluminum bromide, aluminum chloride, antimony pentachloride, ferric chloride, tin tetrachloride, titanium tetrachloride, mercury chloride, and zinc chloride; and compounds other than these, such as iodine and triphenylchloromethane.

The heteropolyacid is a polyacid that has, for example, the Keggin structure in which the central atom in the skeleton of the acid is selected from tungsten, molybdenum, vanadium, and the like atoms, and the hetero atoms are selected from phosphorus, silicon, germanium, titanium, zirconium, boron, arsenic, cobalt, and the like atoms. Examples of the heteropolyacid include phosphotungstic acid, tungstosilicic acid, phosphomolybdic acid, silicomolybdic acid, borotungstic acid, boromolybdic acid, cobalt molybdic acid, cobalt tungstic acid, arsenic tungstic acid, germanium tungstic acid, phosphorus molybdo tungstic acid, and boromolybdo tungstic acid. Among these, phosphotungstic acid is particularly preferred in terms of the colorless property, solubility, and polymerization initiation ability. The heteropolyacid used in the present invention may also be in the form of a partially neutralized salt. Examples of such a partially neutralized salt include sodium salt, potassium salt, cesium salt, organic amine salt, and ammonium salt. The partially neutralized salt of the heteropolyacid may be prepared first and then added to the reaction system, or may be generated by reacting a heteropolyacid and a base in vinyl ether.

A suitable example of the thermal-latent curing catalyst is a compound represented by the following formula (2):

$$(R^5_a R^6_b R^7_c R^8_d Z)^{+m} (AX_n)^{-m} \quad (2)$$

wherein Z represents at least one atom selected from the group consisting of S, Se, Te, P, As, Sb, Bi, O, N, and a halogen element; $R^5$, $R^6$, $R^7$, and $R^8$ are the same as or different from each other, each representing an organic group; a, b, c, and d each are 0 or a positive number, and the sum of a, b, c, and d is equal to the valence of Z; the cation $(R^5_a R^6_b R^7_c R^8_d Z)^{+m}$ represents an onium salt; A represents a metallic element or metalloid element (metalloid) which is the central atom of a halide complex, and is at least one selected from the group consisting of B, P, As, Al, Ca, In, Ti, Zn, Sc, V, Cr, Mn, and Co; X represents a halogen element; m is a net charge of the halide complex ion; and n is the number of halogen elements in the halide complex ion.

Specific examples of the anion $(AX_n)^{-m}$ in formula (2) include tetrafluoroborate ($BF_4^-$), hexafluorophosphate ($PF_6^-$), hexafluoroantimonate ($SbF_6^-$), hexafluoroarsenate ($AsF_6^-$), and hexachloroantimonate ($SbCl_6^-$). Also, an anion represented by formula $AX_n(OH)^-$ can be used. Examples of other anions include perchloric acid ions ($ClO_4^-$), trifluoromethyl sulfite ions ($CF_3SO_3^-$), fluorosulfonic acid ions ($FSO_3^-$), toluenesulfonic acid ions, and trinitro benzenesulfonic acid ions.

Specific products of the thermal-latent curing catalyst include the following products.

Diazonium-salt type: AMERICURE series (product of American Can Co.), ULTRASET series (product of Adeka Corp.), WPAG series (product of Wako Pure Chemical Industries, Ltd.)

Iodonium-salt type: UVE series (product of General Electric Company), FC series (product of 3M Company), UV9310C (product of GE Toshiba Silicones Co., Ltd.), Photoinitiator 2074 (product of Rhone Poulenc S.A.), WPI series (product of Wako Pure Chemical Industries, Ltd.)

Sulfonium-salt type: CYRACURE series (product of Union Carbide Corporation), UVI series (product of General Electric Company), FC series (product of 3M Company), CD series (product of Sartomer Company), Optomer SP series and Optomer CP series (product of Adeka Corp.), San-Aid SI series (product of SANSHIN CHEMICAL INDUSTRY CO., LTD.), CI series (product of Nippon Soda Co., Ltd.), WPAG series (product of Wako Pure Chemical Industries, Ltd.), and CPI series (product of San-Apro Ltd.)

In addition to the above cationic polymerization initiator, what is called a photo cationic polymerization initiator which generates cationic species under light to initiate polymerization can also be used. Examples of the photo cationic initiators include onium salts of Lewis acids, such as triphenylphosphonium hexafluoroantimonate, triphenylphosphonium hexafluorophosphate, p-(phenylthio)phenyldiphenylsulfonium hexafluoroantimonate, 4-chlorophenyldiphenylsulfonium hexafluorophosphate, and (2,4-cyclopentadiene-1-yl)[(1-methylethyl)benzene]-iron-hexafluorophosphate.

Each of the cationic polymerization initiators and/or the photo cationic polymerization initiators may be used alone, or two or more of these may be used in combination. The amount of the initiator used in the present invention is 1 ppm to 30% by mass, preferably 5 ppm to 20% by mass, and particularly preferably 10 ppm to 20% by mass, of the amount of monomer used as a raw material. An amount of less than 1 ppm may not initiate the polymerization, whereas an amount of more than 30% by mass may cause violent polymerization which may not be able to be controlled, may decrease the molecular weight of the resulting polymer, or may cause coloring of the resulting product.

The polymerization of the monomer may be carried out in bulk, and a solvent may be used to control the reaction temperature and viscosity. In production of a polymer using a polymerization catalyst and a polymerization solvent, the polymerization should be performed while the solvent is stirred to disperse the monomer composition. Examples of such a polymerization method include solution polymerization, dispersion polymerization, suspension polymerization, and emulsion polymerization. Among these, solution polymerization is more preferred because of the high productivity. Further, solution polymerization is particularly preferred in which polymerization is performed while a monomer composition as a raw material is supplied to the previously charged solvent, because of the safety viewpoints such as easy heat removal.

The solvent used for polymerization of the monomer is not particularly limited, and examples thereof include organic solvents such as the following ones: aromatic solvents such as toluene and xylene; ether solvents such as propylene glycol methyl ether, dipropylene glycol methyl ether, ethylcellosolve, butylcellosolve, tetrahydrofuran, and 1,4-dioxane; ester solvents such as ethyl acetate, butyl acetate, and cellosolve acetate; ketone solvents such as acetone, methyl ethyl ketone, methyl isobutyl ketone, and diacetone alcohol; amide solvents such as dimethylformamide; halogenated hydrocarbons such as chloroform and trichloroethylene; nitriles such as acetonitrile and benzonitrile; aliphatic hydrocarbons such as hexane and octane; and saturated cyclic hydrocarbons such as cyclohexane and methylcyclohexane. The present invention is not limited only to these examples. Each of these solvents may be used alone, or two or more of these may be used in combination. The amount of the solvent may be, appropriately determined in consideration of the polymerization conditions, the composition of the monomer component, and the concentration of the acrylic polymer to be obtained. In order to obtain a high molecular weight polymer, it is preferable to use a solvent free from active hydrogen, such as aromatic hydrocarbons, aliphatic hydrocarbons, saturated cyclic hydrocarbons, and esters.

To produce the above-mentioned high molecular weight polymer, the amount of impurities in the reaction system, such as moisture and alcohols, is preferably small. In the present invention, the temperature for polymerization of the polymer is not particularly limited, but is preferably −70 C.° to 120° C. Particularly in order to obtain a high molecular weight polymer, the polymerization initiation temperature is preferably adjusted to −10° C. to 90° C., and the highest temperature in the polymerization reaction system is preferably adjusted to 20° C. to 80° C., by heating or cooling. A polymerization temperature of higher than 120° C. may result in a low molecular weight of the polymer to be obtained.

The reaction pressure may be either ordinary pressure or increased pressure, but is usually ordinary pressure.

After completion of the polymerization reaction in polymerization of the monomer, an organic base (e.g., ammonia, amine) or an inorganic base (e.g., NaOH, KOH) may be added to terminate the reaction, or such a compound may not be added. For safety of the resulting product, it is preferable to terminate the reaction using any of the bases.

In the case of reacting the cross-linking functional group in the polymer to produce a cross-linked polymer (cross-linked polymer), a method may be employed which includes dissolving the polymer (prepolymer), a polymerization initiator, and an ionic compound in a solvent, drying the solution to remove the solvent, and carrying out UV irradiation or heating to cause chain addition reaction of the cross-linkable functional monomer. For example, in the case of forming a membrane cross-linked product (cross-linked membrane of a polymer), a cross-linked membrane can be formed by dissolving the polymer, an ionic compound, and a polymerization initiator in a solvent, applying the solution to a sheet such as a Teflon (registered trademark) sheet and drying the solution to obtain a membrane, and irradiating the membrane with UV light or heating the membrane to cause reaction.

Examples of the method of forming a cross-linked product by reacting a cross-linkable functional group in a molecule of a polymer include the above method of causing chain addition reaction of a cross-linkable functional group of a polymer; and a method of forming a cross-linked structure by adding a compound (cross-linking agent) that has two or more functional groups reactive to the cross-linkable functional group of the polymer. Of these methods, the method of forming a cross-linked structure by causing chain addition reaction of a cross-linkable group of a polymer is preferred.

Examples of the polymerization initiator used for the method of causing chain addition reaction of the cross-linkable group include photo radical polymerization initiators, heat radical initiators, anionic polymerization initiators, and photo anionic polymerization initiators. A photo radical polymerization initiator is a component necessary for initiation of a polymerization reaction in which polymerization initiation radicals are generated upon irradiation of active energy rays. A heat radical polymerization initiator is a component necessary for initiation of a polymerization reaction in which polymerization initiation radicals are generated upon heating. A photo anionic polymerization initiator is a component necessary for initiation of a polymerization reaction in which polymerization initiation anionic species are generated upon irradiation of active energy rays. Also, a cross-linked structure may be formed by molding a polymer and a lithium salt of an organic acid into a thin film by kneading extrusion, and causing cross-linking reaction by utilizing the reactivity of the polymer.

The anionic polymerization initiator mentioned herein refers to a component that initiates polymerization reaction in which polymerization initiation anionic species are generated, and that is not included in the photo anionic polymerization initiators.

Examples of the photo radical polymerization initiator include, but not particularly limited to, acetophenones such as diethoxy acetophenone, 2-hydroxy-2-methyl-1-phenylpropane-1-one, benzyl dimethyl ketal, 4-(2-hydroxyethoxy)phenyl-(2-hydroxy-2-propyl)ketone, 1-hydroxycyclohexyl phenyl ketone, 2-methyl-2-morpholino(4-thiomethylphenyl)propane-1-one, 2-benzyl-2-dimethylamino-1-(4-morpholinophenyl)butanone, 2-hydroxy-2-methyl-1-[4-(1-methylvinyl)phenyl]propanone oligomer, 2,2-dimethoxy-1,2-diphenylethane-1-one, 1-[4-(2-hydroxyethoxy)phenyl]-2-hydroxy-2-methyl-1-propane-1-one, 2-hydroxy-1-{4-[4-(2-hydroxy-2-methylpropionyl)benzyl]phenyl}-2-methylpropane-1-one, and 2-dimethylamino-2-[(4-methylphenyl)methyl]-1-[4-(4-morphoryl)phenyl]-1-butanone; benzophenones such as benzophenone, methyl o-benzoylbenzoate, 4-phenylbenzophenone, 4-benzoyl-4'-methyl-diphenyl sulfide, 3,3',4,4'-tetra(t-butylperoxylcarbonyl)benzophenone, 2,4,6-trimethyl benzophenone, 4-benzoyl-N,N-dimethyl-N-[2-(1-oxo-2-propenyloxy)ethyl] benzene methanaminium bromide, and (4-benzoylbenzyl)trimethylammonium chloride; benzoins such as benzoin, benzoin methyl ether, benzoin ethyl ether, benzoin isopropyl ether, and benzoin isobutyl ether; thioxanthones such as 2-isopropylthioxanthone, 4-isopropylthioxanthone, 2,4-diethylthioxanthone, 2,4-dichlorothioxanthone, 1-chloro-4-propoxythioxanthone, 2-(3-dimethylamino-2-hydroxy)-3,4-dimethyl-9H-thioxanthone-9-one mesochloride; acyl phosphine oxides such as 2,4,6-trimethylbenzoyl diphenylphosphine oxide and bis(2,4,6-trimethylbenzoyl)phenylphosphine oxide; titanocenes such as bis(η5-2,4-cyclopentadiene-1-yl)-bis(2,6-difluoro-3-(1H-pyrrol-1-yl) phenyl)titanium; oxime esters such as 1-[4-(phenylthio)-1,2-octanedione 2-(O-benzoyloxime)] and 1-[9-ethyl-6-(2-methylbenzoyl)-9H-carbazol-3-yl]-ethanone 1-(O-acetyloxime); and oxyphenylacetates such as 2-[2-oxo-2-phenylacetoxyethoxy]ethyl ester of oxyphenylacetic acid and 2-(2-hydroxyethoxy)ethyl ester of oxyphenylacetic acid. Each of these photopolymerization initiators may be used alone, or two or more of these may be used in combination. Among these photopolyermization initiators, acetophenones and benzophenones are preferred, and 1-hydroxycyclohexyl phenyl ketone, benzophenone, 2-hydroxy-2-methyl-1-phenylpropane-1-one, 2-methyl-2-morpholino(4-thiomethylphenyl)propane-1-one, and 1-[4-(2-hydroxyethoxy)phenyl]-2-hydroxy-2-methyl-1-propane-1-one are particularly preferred.

Examples of the heat radical polymerization initiator include, but not particularly limited to, the following heat radical polymerization initiators: organic peroxide initiators such as methyl ethyl ketone peroxide, cyclohexanone peroxide, methylcyclohexanone peroxide, methyl acetoacetate peroxide, acetyl acetate peroxide, 1,1-bis(t-hexylperoxy)-3,3,5-trimethylcyclohexane, 1,1-bis(t-hexylperoxy)cyclohexane, 1,1-bis(t-butylperoxy)-3,3,5-trimethylcyclohexane, 1,1-bis(t-butylperoxy)-2-methylcyclohexane, 1,1-bis(t-butylperoxy)cyclohexane, 1,1-bis(t-butylperoxy)cyclododecane, 1,1- bis(t-butylperoxy)butane, 2,2-bis(4,4-di-t-butylperoxycyclohexyl)propane, p-menthane hydroperoxide, diisopropylbenzene hydroperoxide, 1,1,3,3-tetramethylbutyl hydroperoxide, cumene hydroperoxide, t-hexyl hydroperoxide, t-butyl hydroperoxide, α,α'-bis(t-butylperoxy)diisopropylbenzene, dicumyl peroxide, 2,5-dimethyl-2,5-bis(t-butylperoxy)hexane, t-butyl cumyl peroxide, di-t-butyl peroxide, 2,5-dimethyl-2,5-bis(t-butylperoxy)hexyne-3, isobutyryl peroxide, 3,5,5-trimethylhexanoyl peroxide, octanoyl peroxide, lauroyl peroxide, stearoyl peroxide, succinic acid peroxide, m-toluoyl peroxide, benzoyl peroxide, di-n-propyl peroxydicarbonate, diisopropyl peroxydicarbonate, bis(4-t-butylcyclohexyl)peroxydicarbonate, di-2-ethoxyethyl peroxydicarbonate, di-2-ethoxyhexyl peroxydicarbonate, di-3-methoxybutyl peroxydicarbonate, di-s-butyl peroxydicarbonate, di(3-methyl-3-methoxybutyl) peroxydicarbonate, α,α'-bis(neodecanoylperoxy)diisopropylbenzene, cumyl peroxyneodecanoate, 1,1,3,3-tetramethylbutyl peroxyneodecanoate, 1-cyclohexyl-1-methylethyl peroxyneodecanoate, t-hexyl peroxyneodecanoate, t-butyl peroxyneodecanoate, t-hexyl peroxypivalate, t-butyl peroxypivalate, 1,1,3,3-tetramethylbutylperoxy-2-ethylhexanoate, 2,5-dimethyl-2,5-bis(2-ethylhexanoylperoxy)hexane, 1-cyclohexyl-1-methylethylperoxy-2-ethylhexanoate, t-hexylperoxy-2-ethylhexanoate, t-butylperoxy-2-ethylhexanoate, t-hexylperoxyisopropyl monocarbonate, t-butyl peroxyisobutyrate, t-butyl peroxymaleate, t-butylperoxy-3,5,5-trimethylhexanoate, t-butyl peroxylaurate, t-butyl peroxyisopropylmonocarbonate, t-butyl peroxy-2-ethylhexylmonocarbonate, t-butyl peroxyacetate, t-butyl peroxy-m-toluoylbenzoate, t-butyl peroxybenzoate, bis(t-butylperoxy)isophthalate, 2,5-dimethyl-2,5-bis(m-toluoylperoxy)hexane, t-hexyl peroxybenzoate, 2,5-dimethyl-2,5-bis(benzoylperoxy)hexane, t-butyl peroxyallylmonocarbonate, t-butyl trimethylsilyl peroxide, 3,3',4,4'-tetra(t-butylperoxycarbonyl)benzophenone, and 2,3-dimethyl-2,3-diphenylbutane.

The examples of the heat radical polymerization initiator also include azo initiators such as 2-phenylazo-4-methoxy-2,4-dimethylvaleronitrile, 1-[(1-cyano-1-methylethyl)azo]formamide, 1,1'-azobis(cyclohexane-1-carbonitrile), 2,2'-azobis(2-methylbutyronitrile), 2,2'-azobisisobutyronitrile, 2,2'-azobis(2,4-dimethylvaleronitrile), 2,2'-azobis(4-methoxy-2,4-dimethylvaleronitrile), 2,2'-azobis(2-methylpropionamidine)dihydrochloride, 2,2'-azobis(2-methyl-N-phenylpropionamidine)dihydrochloride, 2,2'-azobis[N-(4-chlorophenyl)-2-methylpropionamidine]dihydrochloride, 2,2'-azobis[N-(4-hydrophenyl)-2-methylpropionamidine]dihydrochloride, 2,2'-azobis[2-methyl-N-(phenylmethyl)propionamidine]dihydrochloride, 2,2'-azobis[2-methyl-N-(2-propenyl)propionamidine]dihydrochloride, 2,2'-azobis[N-(2-hydroxyethyl)-2-methylpropionamidine]dihydrochloride, 2,2'-azobis[2-(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepine-2-yl)propane]dihydrochloride, 2,2'-azobis[2-(3,4,5,6-tetrahydropyrimidine-2-yl)propane]dihydrochloride, 2,2'-azobis[2-(5-hydroxy-3,4,5,6-tetrahydropyrimidine-2-yl)propane]dihydrochloride, 2,2'-azobis{2-[1-(2-hydroxyethyl)-2-imidazolin-2-yl]propane}dihydrochloride, 2,2'-azobis[2-(2-imidazolin-2-yl)propane], 2,2'-azobis{2-methyl-N-[1,1-bis(hydroxymethyl)-2-hydroxyethyl]propionamide}, 2,2'-azobis{2-methyl-N-[1,1-bis(hydroxymethyl)ethyl]propionamide}, 2,2'-azobis[2-methyl-N-(2-hydroxyethyl)propionamide], 2,2'-azobis(2-methylpropionamide), 2,2'-azobis(2,4,4-trimethylpentane), 2,2'-azobis(2-methylpropane), dimethyl-2,2'-azobis(2-methylpropionate), 4,4'-azobis(4-cyanopentanoic acid), and 2,2'-azobis[2-(hydroxymethyl)propionitrile].

The examples of the heat radical polymerization initiator also include acetophenones such as diethoxyacetophenone, 2-hydroxy-2-methyl-1-phenylpropane-1-one, benzyl dimethyl ketal, 4-(2-hydroxyethoxy)phenyl-(2-hydroxy-2-propyl)ketone, 1-hydroxycyclohexyl phenyl ketone, 2-methyl-2-morpholino(4-thiomethylphenyl)propane-1-one, 2-benzyl-2-dimethylamino-1-(4-morpholinophenyl)butanone, and 2-hydroxy-2-methyl-1-[4-(1-methylvinyl)phenyl]propanone oligomer; benzoins such as benzoin, benzoin methyl ether, benzoin ethyl ether, benzoin isopropyl ether, and benzoin isobutyl ether; benzophenones such as benzophenone, methyl o-benzoylbenzoate, 4-phenylbenzophenone, 4-benzoyl-4'-methyl-diphenyl sulfide, 3,3',4,4'-tetra(t-butylperoxycarbonyl)benzophenone, 2,4,6-trimethyl benzophenone, 4-benzoyl-N,N-dimethyl-N-[2-(1-oxo-2-propenyloxy)ethyl]benzene methanaminium bromide, and (4-benzoylbenzyl)trimethyl ammonium chloride; and thioxanthones such as 2-isopropylthioxanthone, 4-isopropylthioxanthone, 2,4-diethylthioxanthone, 2,4-dichlorothioxanthone, 1-chloro-4-propoxythioxanthone, and 2-(3-dimethylamino-2-hydroxy)-3,4-dimethyl-9H-thioxanthone-9-one mesochloride. Each of these heat radical polymerization initiators may be used alone, or two or more of these may be used in combination. Among these heat radial polymerization initiators, organic peroxide initiators and azo initiators are preferred.

Examples of the anionic polymerization initiator include, but not particularly limited to, alkali metal compounds containing an alkali metal and a carbanion, such as sodium naphthalene, n-butyl lithium, and t-butyl lithium; trialkylaluminums such as trimethylaluminum, triethylaluminum, a tripropylaluminum, triisopropylaluminum, tributylaluminum, and triisobutylaluminum; chloro dialkylaluminum, chloro diethylaluminum, chloro dipropylaluminum, chloro diisopropylaluminum, chloro dibutylaluminum, chloro diisobutylaluminum, bispentamethylcyclopentadienyl samarium, and methyl-bispentamethylcyclopentadienyl samarium.

Examples of the photo anionic polymerization initiator include, but not particularly limited to, alkoxy titanium and p-chlorophenyl-o-nitrobenzyl ether.

Each of these anionic polymerization initiators and/or photo anionic polymerization initiators may be used alone, or two or more of these may be used in combination.

The lower limit of the amount of the radical polymerization initiator is preferably 0.01% by mass, more preferably 0.05% by mass, and still more preferably 0.1% by mass of the amount of the prepolymer, whereas the upper limit thereof is preferably 20% by mass, more preferably 15% by mass, and still more preferably 10% by mass. An amount of less than 0.01% by mass may not lead to sufficient curing, resulting in a decrease in the film strength. In contrast, an amount of more than 20% by mass may not further improve the film properties, but rather adversely affect the film properties to deteriorate the economic efficiency.

The amount of the anionic polymerization initiator and/or the photo anionic polymerization initiator is usually 0.01 to 30% by mass of the amount of the prepolymer.

The electrolyte material of the present invention contains a polymer with the ether bond in a side chain, has excellent reduction resistance and ionic conductivity, and has better ionic conductivity at low temperatures than polyethylene glycol that is widely considered as a polymer electrolyte material. Accordingly, the electrolyte material can be suitably used as a conduction aid, a positive electrode binder, a negative electrode binder, and an inorganic solid electrolyte binder, as well as an electrolyte, and these binders can improve moldability without deteriorating electrochemical properties. Such an electrode binder which contains the electrolyte material of the present invention is another aspect of the present invention. Further, a cell material containing the electrolyte material of the present invention which can be suitably used as any of various materials for a cell is yet another aspect of the present invention.

The electrolyte salt used in the present invention contains an ionic compound containing an alkali metal cation and at least one anion selected from the group consisting of $PF_6^-$, $BF_4^-$, $CF_3SO_3^-$, tetracyanoborate, and $R^3SO_2N^-SO_2R^4$ wherein $R^3$ and $R^4$ are the same as or different from each other, each representing either F, $CF_3$, or $C_2F_5$.

The electrolyte salt in the electrolyte material of the present invention may contain one of the above ionic compounds, or two or more of the ionic compounds. As long as the electrolyte material of the present invention contains the above ionic compound, the electrolyte material may contain other electrolyte salt(s).

The anion is preferably at least one selected from the group consisting of $PF_6^-$, tetracyanoborate, and $R^3SO_2N^-SO_2R^4$ wherein $R^3$ and $R^4$ are the same as or different from each other, each representing either F, $CF_3$, or $C_2F_5$, and is more preferably at least one selected from tetracyanoborate, and $R^3SO_2N^-SO_2R^4$ wherein $R^3$ and $R^4$ are the same as or different from each other, each representing either F or $CF_3$.

The alkali metal cation used is preferably a lithium cation. Use of such an ionic compound allows the electrolyte material of the present invention to be more suitably used as an electrolyte. Specific suitable examples of the ionic compound include lithium bistrifluoromethanesulfonylimide (LiTFSI), lithium difluorosulfonylimide (LiFSI), and lithium tetracyanoborate (LiTCB).

The amount of the ionic compound is preferably 1 to 50% by mass based on 100% by mass of the polymer having an ether bond in a side chain thereof used in the present invention. The amount of the ionic compound in such a range produces an electrolyte that exhibits more favorable ionic conductivity. The amount of the ionic compound is more preferably 1 to 40% by mass, and still more preferably 1 to 30% by mass, based on 100% by mass of the polymer having an ether bond in a side chain thereof used in the present invention.

In the electrolyte material of the present invention, the amount of components (impurities) other than the ionic compound and the polymer having an ether bond in a side chain thereof in the present invention is preferably 5% by mass or less in 100% by mass of the electrolyte material. An amount of the impurities of more than 5% by mass may decrease the ionic conductivity or deteriorate the properties with time because of the electrochemical reaction. The amount is more preferably 1% by mass or less.

The impurities herein include polymerization inhibitors, the chain transfer agent, the solvent, and unreacted reaction raw materials which are used in production of the polymer having an ether bond in a side chain thereof in the present invention; by-products decomposed from the reaction raw materials; and the like.

The electrolyte material of the present invention may contain an organic solvent to improve plasticity, film-forming properties, and fire retardancy. Examples of the organic solvent include compounds represented by the following formula (3):

$$M(=O)_m(OR^9)_3 \quad (3)$$

wherein $R^9$ represents a C1 to C18 linear, branched, or cyclic hydrocarbon group or alkylene carbonate group; M represents any one of elements of Al, B, and P; m=0 in the case that M represents Al, which makes an aluminate; m=0 in the case of M representing B, which makes a borate; and m=1 in the case of M representing P, which makes a phosphate.

The examples of the organic solvent also include ethers such as 1,2-dimethoxyethane, tetrahydrofuran, 2-methyltetrahydrofuran, crown ether, ethylene glycol dimethyl ether, ethylene glycol diethylether, 1,4-dioxane, 1,3-dioxolane, 2,6-dimethyltetrahydrofuran, tetrahydropyran, triethylene glycol methyl ether, and tetraethylene glycol dimethyl ether; chain carbonates such as dimethyl carbonate, ethyl methyl carbonate, diethyl carbonate, diphenyl carbonate, and methyl phenyl carbonate; cyclic carbonates such as ethylene carbonate, propylene carbonate, 2,3-dimethylethylene carbonate, butylene carbonate, vinylene carbonate, and 2-vinylethylene carbonate; aliphatic carboxylates such as methyl formate, methyl acetate, methyl propionate, ethyl acetate, propyl acetate, butyl acetate, and amyl acetate; aromatic carboxylates such as methyl benzoate and ethyl benzoate; cyclic carboxylates such as γ-butyrolactone, γ-valerolactone, and δ-valerolactone; nitriles such as acetonitrile, propionitrile, methoxy propionitrile, glutaronitrile, adiponitrile, and 2-methylglutaronitrile; aromatic nitriles such as benzonitrile and tolunitrile; amides such as N-methylformamide, N-ethylformamide, N,N-dimethylformamide, N,N-dimethylacetamide, N-methylpyrrolidinone, N-methylpyrrolidone, and N-vinylpyrrolidone; sulfur compounds such as dimethyl sulfone, ethyl methyl sulfone, diethyl sulfone, sulfolane, 3-methyl sulfolane, 2,4-dimethyl sulfolane, dimethyl sulfoxide, methyl ethyl sulfoxide, and diethyl sulfoxide; alcohols such as ethylene glycol, propylene glycol, ethylene glycol monomethyl ether, and ethylene glycol monoethyl ether; and other compounds such as nitromethane, 1,3-dimethyl-2-imidazolidinone, 1,3-dimethyl-3,4,5,6-tetrahydro-2(1H)-pyrimidinone, and 3-methyl-2-oxazolidinone. Each of these may be used alone, or two or more of these may be used in combination. Among these, aluminate esters, borate esters, phosphate esters, carbonate esters, aliphatic esters, cyclic esters, and ethers are preferred, and aluminate esters, borate esters, phosphate esters, carbonate esters, and cyclic esters such as γ-butyrolactone and γ-valerolactone are still more preferred. In the case that the electrolyte material of the present invention contains a solvent, the amount is preferably 1 to 500% by mass based on 100% by mass of the electrolyte material. The amount is more preferably 1 to 100% by mass.

The viscosity at 25° C. of the electrolyte material is preferably 100 to 100000 cps (0.1 to 100 Pa·s). The viscosity in such a range improves the binding ability and the workability in coating film formation. The viscosity is more preferably 300 to 50000 cps (0.3 to 50 Pa·s).

The viscosity of the electrolyte material can be measured with a commercially available B-type viscometer or E-type viscometer, for example.

The ionic conductivity of the electrolyte material at 25° C. is preferably $10^{-6}$ S/cm or more, more preferably $10^{-5}$ S/cm or more, still more preferably $10^{-4}$ S/cm or more, and most preferably $3 \times 10^{-4}$ S/cm or more. Also, the ionic conductivity at 0° C. is preferably $10^{-6}$ S/cm or more, more preferably $10^{-5}$ S/cm or more, and still more preferably $10^{-4}$ S/cm or more.

The ionic conductivity can be measured using the impedance analyzer SI1260 (product of Solartron Inc.), as in the later-described examples.

The electrolyte material of the present invention can exhibit excellent properties as an electrolyte as mentioned above, and can be suitably used as an electrolyte for a secondary cell. Particularly, the electrolyte material can exhibit favorable properties not only at room temperature but also at low temperatures at which polyethylene glycol currently widely considered as an electrolyte for a secondary cell today cannot exhibit favorable cell properties. Therefore, the advantages of the electrolyte material of the present invention are more significant in the case that the electrolyte material is used at low temperatures. That is, yet another preferred embodiment of the present invention is that the electrolyte material has an operating temperature range that includes 0° C. to 25° C.

The electrolyte material of the present invention can exhibit excellent ionic conductivity and be used at a wide range of temperatures other than the above operating temperatures of 0° C. to 25° C.

The electrolyte material of the present invention is also a cell material that can be suitably used as any of various cell materials such as a conduction aid, a positive electrode binder, a negative electrode binder, and an inorganic solid electrolyte binder, as well as an electrolyte as described above. Such a secondary cell produced using the cell material of the present invention is yet another aspect of the present invention.

The secondary cell mainly includes a positive electrode, an electrolyte, and a negative electrode. The positive electrode in the secondary cell can be one obtained by applying to a substrate a slurry that contains a solvent, a positive electrode active material, a conduction aid, and optionally a binder; and drying the slurry. The negative electrode can be one obtained by applying to a substrate a slurry containing a solvent, a negative electrode active material, a conduction aid, and optionally a binder; and drying the slurry.

A secondary cell including the electrolyte material of the present invention as any one of the electrolyte, the conduction aid, and the binder is the secondary cell of the present invention.

The positive electrode active material can be a lithium-manganese complex oxide, lithium cobaltate, vanadium pentoxide, a compound having an olivine structure, polyacethylene, polypyrene, polyaniline, polyphenylene, polyphenylene sulfide, polyphenylene oxide, polypyrrole, polyfuran, or polyazulene. The compound having an olivine structure is a compound having a structure represented by the following formula (4):

$$Li_xA_yD_zPO_4 \quad (4)$$

(wherein A is one or two or more selected from the group consisting of Cr, Mn, Fe, Co, Ni, and Cu; D is one or two or more selected from the group consisting of Mg, Ca, Sr, Ba, Ti, Zn, B, Al, Ga, In, Si, Ge, Sc, Y, and a rare earth element; and x, y, and z each are a number satisfying $0<x<2$, $0<y<1.5$, and $1\leq z\leq 1.5$). Use of such a positive electrode active material causes the oxygen atom in the structure to bond to phosphorus so that $(PO_4)^{3-}$ polyanions are formed, which immobilizes oxygen in the crystal structure. Hence, theoretically, combustion reaction does not occur, and thus such a compound provides high safety and is preferred in consideration of applications to a medium- or large-sized power source. The A component is preferably Fe, Mn, or Ni, and particularly preferably Fe. The D component is preferably Mg, Ca, Ti, or Al.

Specific examples of the compounds having an olivine structure include lithium iron phosphate and lithium manganese phosphate, and these are preferably contained in the positive electrode active material. The compound having an olivine structure is more preferably lithium iron phosphate coated with carbon. Lithium iron phosphate provides high safety, high stability against overcharge, and is inexpensive because abundant resources such as iron and phosphorus are used, which makes lithium iron phosphate preferable in terms of the production cost.

The proportion of the compound having an olivine structure in the positive electrode active material is 70% by mass or higher in 100% by mass of the positive electrode active material. The proportion is more preferably 90% by mass or higher, and most preferably that the positive electrode active material consists only of a compound having an olivine structure.

In this way, yet another preferred embodiment of the present invention is that the above secondary cell includes an olivine-type lithium iron phosphate as the positive electrode active material.

The conduction aid mainly used, other than the cell material of the present invention, is conductive carbon. Examples of the conductive carbon include carbon black, fiber-like carbon, and graphite. Among these, the cell material of the present invention, ketjen black, acetylene black, graphite, and the like are preferred.

The solvent may be an aromatic hydrocarbon compound (e.g., toluene), or a polar compound free from active hydrogen (e.g., acetonitrile, acetone, tetrahydrofuran).

The amount of the solvent in the positive electrode active material is preferably 50 to 300% by mass based on 100% by mass of the positive electrode active material. The amount of the solvent in the above range allows production of a slurry having an appropriate viscosity. The amount is more preferably 70 to 200% by mass.

The positive electrode active material preferably further contains a dispersant. In the case of using a dispersant, the dispersant is not particularly limited, and may be an anionic, nonionic, or cationic surfactant, or a dispersant of various kinds such as a polymer dispersant. The dispersant promotes atomization of the positive electrode active material and the conduction aid to increase the dispersibility, achieving more stable conductivity of the positive electrode film.

The amount of the dispersant is preferably 5 to 20% by mass based on 100% by mass of the conduction aid. An amount of the dispersant in such a range allows uniform dispersion of the positive electrode active material and the conduction aid. The amount is more preferably 6 to 15% by mass based on 100% by mass of the conduction aid.

The negative electrode active material can be a generally used negative electrode active material. In the case of a lithium ion cell, the negative electrode active material may be a polymer, an organic substance, carbon obtained by produced by baking pitch, natural graphite, Li metal, at least one selected from Al, Si, Ge, Sn, Pb, In, Zn, and Ti, an alloy containing any of these elements, an oxide containing any of these elements, a material capable of reversibly occluding and releasing lithium (e.g. lithium titanate), or the like.

Examples of the conduction aid, the solvent, and the dispersant in the negative electrode active material may include the same materials as described above.

For the electrolyte, the cell material of the present invention, an organic electrolyte (containing an electrolyte salt and an organic solvent), a solid polymer electrolyte, an inorganic solid electrolyte, a fused salt, and the like can be used in combination. Among these, the cell material of the present invention is preferred.

The electrode composition can further contain a binder. For the binder, the electrode binder of the present invention, a modified polymer obtained by introducing a functional group (e.g., carboxyl group) into a hydrogenated diene polymer, an aqueous dispersion of a complexed polymer obtained by complexing a polymer containing fluorine and an acrylic polymer having a functional group such as a carboxyl group may be used in combination. Among these, the electrode binder of the present invention is preferably used.

Advantageous Effects of Invention

The electrolyte material of the present invention having the above-described structure not only exhibits excellent ionic conductivity at room temperature but also exhibits favorable ionic conductivity even at room temperature and lower temperatures, and is also excellent in reduction resistance. The electrolyte material of the present invention therefore can be suitably used as an electrolyte for a cell such as a lithium ion cell, and also as a conduction aid or an electrode binder.

DESCRIPTION OF EMBODIMENTS

Hereinafter, the present invention will be described in more detail based on the examples which, however, are not intended to limit the scope of the present invention. Here, "part(s)" refer(s) to "part(s) by weight", and "%" refers to "% by mass", unless otherwise specified.

The measurements were carried under the following conditions.
(Ionic Conductivity)

The ionic conductivity of the prepared electrolyte material was measured by the following method. The measuring device used was impedance analyzer SI1260 (product of Solartron Inc.), and the measuring cells used were ones described below.

Electrolyte mixture: a sample (electrolyte mixture) was sandwiched between SUS electrodes with an electrode area of 1 cm$^2$ and a distance between electrodes of 1 cm, and the resistance was measured by the alternating current impedance method (0.1 V to 0.3 V, frequency: 10 Hz to 10 MHz), so that the ionic conductivity was calculated.

Electrolyte film: a sample (electrolyte film) was sandwiched between SUS electrodes with an electrode area of 120, and the resistance was measured by the alternating current impedance method (0.1 V, frequency: 10 Hz to 10 MHz), so that the ionic conductivity was calculated.
(Viscosity)

The viscosity was measured using an E-type viscometer (model "DV-III+": product of Brookfield).
(Weight average molecular weight)

The weight average molecular weight was determined by GPC (gel permeation chromatography) under the following measurement conditions.
  Measuring equipment: HLC-8120
  Molecular-weight column: G5000HXL and GMHXL-L (products of Tosoh Corp.) connected in series
  Eluate: tetrahydrofuran
  Reference material for calibration curves: polystyrene
  Measuring method: the measurement object is dissolved in the eluate to a solid content of 0.3% by mass, and the resulting solution is filtered with a filter.
(Preparation 1)
  Production of Diethylene Glycol Methyl Vinyl Ether A 0.5-L flask equipped with a stirrer, a dropping funnel, a thermometer, a condenser tube, and a nitrogen gas inlet was charged with 198 parts of diethylene glycol monovinyl ether and 88 parts of potassium hydroxide. The flask was heated to 40° C. with stirring under a nitrogen atmosphere, and then 277 parts of methyl iodide was slowly dropped while the internal temperature was maintained at 40° C. or lower. After completion of the dropping, the mixture was aged for five hours, and the resulting potassium iodide was removed by filtration.

Subsequently, the reaction filtrate was distilled under reduced pressure so that unreacted methyl iodide and diethylene glycol monovinyl ether were removed. Then, the desired diethylene glycol methyl vinyl ether was isolated.

The purity of diethylene glycol methyl vinyl ether obtained as above was 99% or higher, and the yield thereof relative to diethylene glycol monovinyl ether used as a raw material was about 70%.
(Preparation 2)
  Production of Diethylene Glycol Methyl Methallyl Ether A 2-L flask equipped with a stirrer, a dropping funnel, a thermometer, a condenser tube, and a nitrogen gas inlet was charged with 1201 parts of diethylene glycol monomethyl ether and 420 parts of sodium hydroxide. The flask was heated to 70° C. with stirring under a nitrogen atmosphere, and then 1087 parts of methallyl chloride was slowly dropped while the internal temperature was maintained at 70° C. or lower. After completion of the dropping, the mixture was aged for six hours, and the resulting sodium chloride was removed by filtration.

Subsequently, the reaction filtrate was distilled under reduced pressure so that unreacted methallyl chloride and diethylene glycol monomethyl ether were removed. Then, the desired diethylene glycol methyl vinyl ether was isolated.

The purity of diethylene glycol methyl methallyl ether obtained as above was 99% or higher, and the yield thereof relative to diethylene glycol monomethyl ether used as a raw material was about 60%.
(Preparation 3)
  Production of Heptaethylene Glycol Methyl Vinyl Ether A 0.1-L SUS autoclave reaction vessel equipped with a thermometer, a stirrer, a raw material inlet pipe, and a nitrogen inlet tube was charged with 29 parts of diethylene glycol monovinyl ether and 0.4 parts of sodium hydroxide as an addition reaction catalyst. The air in the reaction vessel was replaced by nitrogen with stirring, and the reaction vessel was heated to 100° C. Subsequently, 48 parts of ethylene oxide was introduced into the reaction vessel over four hours while the temperature was maintained at 100° C. under safety pressure. After completion of the introduction, the mixture was aged for 0.5 hours at an internal temperature of 100° C. All the amount of ethylene oxide was reacted, and the reaction product obtained was heptaethylene glycol vinyl ether in which an average of 7 moles of ethylene oxide was bonded to vinyl alcohol.

A 1-L flask equipped with a stirrer, a dropping funnel, a thermometer, a condenser tube, and a nitrogen gas inlet was charged with 50 parts of heptaethylene glycol vinyl ether and 11 parts of sodium hydroxide. The flask was heated to 40° C. with stirring under a nitrogen atmosphere, and then 40 parts of methyl iodide was slowly dropped while the internal temperature was maintained at 40° C. or lower. After completion of the dropping, the mixture was aged for five hours, and distilled under reduced pressure so that unreacted methyl iodide was removed. In order to further remove sodium hydroxide in excess and water and sodium iodide generated after the reaction, adsorption treatment was performed using an adsorbent, and thereby heptaethylene glycol methyl vinyl ether was obtained.

The purity of heptaethylene glycol methyl vinyl ether obtained as above was 99% or higher, and the yield thereof relative to diethylene glycol monovinyl ether used as a raw material was about 42%.

(Preparation 4)
Production of Decaethylene Glycol Methyl Vinyl Ether

A 1-L SUS autoclave reaction vessel equipped with a thermometer, a stirrer, a material inlet pipe, and a nitrogen inlet tube was charged with 277 parts of diethylene glycol monovinyl ether and 4.1 parts of sodium hydroxide as an addition reaction catalyst. The air in the reaction vessel was replaced by nitrogen with stirring, and the reaction vessel was heated to 100° C. Subsequently, 735 parts of ethylene oxide was introduced into the reaction vessel over four hours while the temperature was maintained at 100° C. under safety pressure. After completion of the introduction, the mixture was aged for 0.5 hours at an internal temperature of 100° C. All the amount of ethylene oxide was reacted, and the reaction product obtained was decaethylene glycol vinyl ether in which an average of 10 moles of ethylene oxide was bonded to vinyl alcohol.

A 1-L flask equipped with a stirrer, a dropping funnel, a thermometer, a condenser tube, and a nitrogen gas inlet was charged with 500 parts of decaethylene glycol vinyl ether and 80 parts of sodium hydroxide. The flask was heated to 40° C. with stirring under a nitrogen atmosphere, and then 287 parts of methyl iodide was slowly dropped while the internal temperature was maintained at 40° C. or lower. After completion of the dropping, the mixture was aged for five hours, and distilled under reduced pressure so that unreacted methyl iodide was removed. In order to further remove sodium hydroxide in excess and water and sodium iodide generated after the reaction, adsorption treatment was performed using an adsorbent, and thereby decaethylene glycol methyl vinyl ether was obtained.

The purity of decaethylene glycol methyl vinyl ether obtained as above was 99% or higher, and the yield thereof relative to diethylene glycol monovinyl ether used as a raw material was about 40%.

(Preparation 5)
Production of Decaalkylene Glycol Methyl Vinyl Ether (ethylene oxide-propylene oxide copolymer)

A decaalkylene glycol methyl vinyl ether was obtained in the same manner as in Preparation 4, except that a mixture (molar ratio: 7:1) of ethylene oxide and propylene oxide was introduced in place of the ethylene oxide introduced in Preparation 4.

Example 1

A 0.5-L flask equipped with a stirrer, a dropping opening, a thermometer, a condenser tube, and a nitrogen gas inlet was charged with 95 parts of butyl acetate and 45 parts of diethylene glycol methyl vinyl ether. The mixture was stirred for 10 minutes at room temperature, and a mixture (polymerization initiator) of 0.1 parts of phosphotungstic acid and 10 parts of butyl acetate was put into the flask, so that the temperature of the mixture increased by self-heating. Since the temperature of the solution did not increase any more after 15 minutes, 0.05 parts of triethylamine was added such that the mixture was neutralized. Thereby, a solution with a nonvolatile content of the polymer of 30.0% was obtained. The weight average molecular weight of the obtained polymer was 10000.

The polymer solution obtained thereby was condensed by a rotating evaporator, and then the volatile component was removed by a vacuum dryer. In 10 parts of the obtained polymer, 2.5 parts of lithium bistrifluoromethane sulfonyl imide (LiTFSI) was dissolved, whereby an electrolyte was obtained. The measured ionic conductivity and viscosity of the mixture are shown in Table 1. In Tables 1 and 3, a "viscous product" refers to a product having such high viscosity that the viscosity could not be measured.

Example 2

A 0.5-L flask equipped with a stirrer, a dropping opening, a thermometer, a condenser tube, and a nitrogen gas inlet was charged with 70 parts of butyl acetate and 80 parts of diethylene glycol methylmethallyl ether, and the flask was heated to 85° C. After the temperature reached 85° C., a mixture of 0.4 parts of San-Aid SI-60 (product of SANSHIN CHEMICAL INDUSTRY CO., LTD.) and 10 parts of butyl acetate was put into the flask, so that the temperature of the mixture increased by self-heating. Since the temperature of the solution did not increase any more after 15 minutes, 0.2 parts of triethylamine was added such that the mixture was neutralized. Thereby, a solution with a nonvolatile content of the polymer of 42.0% was obtained. The weight average molecular weight of the obtained polymer was 1000.

The polymer solution obtained thereby was condensed by a rotating evaporator, and then the volatile component was removed by a vacuum dryer. In 10 parts of the obtained polymer, 2.5 parts of LiTFSI was dissolved, whereby an electrolyte was obtained. The measured ionic conductivity and viscosity of the mixture are shown in Table 1.

Examples 3 to 5

A polymer was obtained in the same manner as in Example 1, except that the compositions of the monomer components and the like used in the synthesis were changed to the values shown in Table 2. The physical properties of the obtained polymer are shown in Table 2. An electrolyte was obtained from the polymer by the same method as in Example 1, and the ionic conductivity and viscosity of the mixture were measured. The results are shown in Table 1.

TABLE 1

| | | Ionic conductivity (mS/cm) | | | | | Viscosity (cps) | | | | |
|---|---|---|---|---|---|---|---|---|---|---|---|
| | | Example 1 | Example 2 | Example 3 | Example 4 | Example 5 | Example 1 | Example 2 | Example 3 | Example 4 | Example 5 |
| Temperature (° C.) | 60 | 0.54 | 1.0 | 0.53 | 0.44 | 0.35 | 1714 | 33 | 2068 | 2124 | 2977 |
| | 40 | 0.30 | 0.61 | 0.28 | 0.23 | 0.18 | 4481 | 73 | 5683 | 6270 | 9724 |
| | 25 | 0.17 | 0.38 | 0.14 | 0.13 | 0.10 | 13770 | 175 | Viscous product | Viscous product | 29600 |
| | 0 | 0.07 | 0.10 | 0.07 | 0.08 | 0.07 | Viscous product | 1119 | Viscous product | Viscous product | Viscous product |
| | −20 | 0.08 | 0.05 | 0.09 | 0.09 | 0.09 | Viscous product | Viscous product | Viscous product | Viscous product | Viscous product |

TABLE 2

|  |  | Example 3 | Example 4 | Example 5 |
|---|---|---|---|---|
| Monomer component composition (%) | Diethylene glycol methyl vinyl ether | 93 | 85 | 60 |
|  | Butyl vinyl ether | 7 | 15 | 40 |
| Polymerization initiator (%) | Phosphotungstic acid | 0.2 | 0.2 | 0.2 |
| Weight average molecular weight |  | 10100 | 10000 | 10000 |

Example 6

A 0.5-L flask equipped with a stirrer, a dropping opening, a thermometer, a condenser tube, and a nitrogen gas inlet was charged with 95 parts of butyl acetate, 42.7 parts of diethylene glycol methyl vinyl ether, and 2.3 parts of vinyloxy ethoxy ethyl acrylate. The mixture was stirred for 10 minutes at room temperature, and a mixture (polymerization initiator) of 0.1 parts of phosphotungstic acid and 10 parts of butyl acetate was put into the flask, so that the temperature of the mixture increased by self-heating. Since the temperature of the solution did not increase any more after 15 minutes, 0.05 parts of triethylamine was added such that the mixture was neutralized. Thereby, a solution with a nonvolatile content of the polymer of 30.0% was obtained. The weight average molecular weight of the obtained polymer was 9600. The polymer solution obtained thereby was condensed by a rotating evaporator, and then the volatile component was removed by a vacuum dryer. In 10 parts of the obtained polymer, 2.5 parts of LiTFSI and 0.1 parts of a photo radical polymerization initiator KT046 (product of DKSH Japan; 2,4,6-trimethylbenzoyl diphenylphosphine oxide is included) were dissolved, whereby a mixture was obtained.

The obtained mixture solution was applied to a Teflon (registered trademark) sheet by a 1-mil applicator. The coating film was irradiated with UV (UV-irradiation machine: light equipment URM-100 for printing, product of USHIO, INC.; UV irradiation condition: (output) 450 W, (irradiation time) 40 seconds), and a 25 μm-thick electrolyte film was obtained from the polymer composition. The ionic conductivity at 25° C. of the obtained film was measured, and the result is shown in Table 3.

Example 7

In 10 parts of the polymer obtained in Example 1, 0.93 parts of lithium tetracyano borate (LiTCB) was dissolved, whereby an electrolyte was obtained. The measured ionic conductivity and viscosity of the mixture are shown in Table 3.

Comparative Example 1

Polyethylene glycol 10000 (product of Wako) was used in place of the reaction mixture obtained in Example 1. In 10 parts of the polymer, 2.5 parts of LiTFSI was dissolved, whereby an electrolyte was obtained. The measured ionic conductivity and viscosity of the mixture are shown in Table 3. The measurement error was large under high resistance/low current at a temperature of 0° C. or lower, and stable ionic conductivity was not obtained. Polyethylene glycol froze at a temperature of 40° C. or lower, and thus the viscosity could not be measured.

In Table 3, the symbol "-" in the columns under ionic conductivity indicates that the measurement error was large and thus stable ionic conductivity was not obtained, and the symbol "/" indicates that no evaluation was made.

TABLE 3

|  |  | Ionic conductivity (mS/cm) | | | Viscosity (cps) | |
|---|---|---|---|---|---|---|
|  |  | Example 6 | Example 7 | Comparative Example 1 | Example 7 | Comparative Example 1 |
| Temperature (° C.) | 60 |  | 0.84 | 0.78 | 595 | 4620 |
|  | 40 |  | 0.42 | 0.10 | 1488 | Froze |
|  | 25 | 0.01 | 0.27 | 0.06 | 3274 | Froze |
|  | 0 |  | 0.081 | — | 26491 | Froze |
|  | −20 |  | 0.081 | — | Viscous product | Froze |

Example 8

A 0.5-L flask equipped with a stirrer, a dropping opening, a thermometer, a condenser tube, and a nitrogen gas inlet was charged with 120 parts of butyl acetate and 30 parts of heptaethylene glycol methyl vinyl ether. The mixture was stirred for 10 minutes while the flask was cooled in an acetone-dry ice bath, so that the reaction solution was cooled to −5° C. A mixture (polymerization initiator) of 0.01 parts of picryl sulfonic acid and 1 part of butyl acetate was put into the flask, so that the temperature of the mixture increased by self-heating. Since the temperature of the solution did not increase any more after 10 minutes, 0.03 parts of triethylamine was added such that the mixture was neutralized. Thereby, a solution with a nonvolatile content of the polymer of 20.0% was obtained. The weight average molecular weight of the obtained polymer was 10000.

The polymer solution obtained thereby was condensed by a rotating evaporator, and then the volatile component was removed by a vacuum dryer. In 10 parts of the obtained polymer, 2.5 parts of lithium bistrifluoromethane sulfonyl imide (LiTFSI) was dissolved, whereby an electrolyte was obtained. The measured ionic conductivity and viscosity of the mixture are shown in Table 4.

Example 9

A polymer was obtained in the same manner as in Example 8, except that decaethylene glycol methyl vinyl ether was used instead of heptaethylene glycol methyl vinyl ether. The weight average molecular weight of the obtained polymer was 8000.

The polymer solution obtained thereby was condensed by a rotating evaporator, and then the volatile component was removed by a vacuum dryer. In 10 parts of the obtained polymer, 2.5 parts of lithium bistrifluoromethane sulfonyl imide (LiTFSI) was dissolved, whereby an electrolyte was obtained. The measured ionic conductivity of the mixture is shown in Table 4.

Example 10

In 10 parts of the polymer obtained in Example 9, 1.6 parts of lithium bisfluoro sulfonyl imide (LiFSI) was dissolved, whereby an electrolyte was obtained. The measured ionic conductivity and viscosity of the mixture are shown in Table 4.

Example 11

In 10 parts of the polymer obtained in Example 9, 1.1 parts of lithium tetracyanoborate (LiTCB) was dissolved, whereby an electrolyte was obtained. The measured ionic conductivity and viscosity of the mixture are shown in Table 4.

Example 12

In 10 parts of the polymer obtained in Example 9, 0.2 parts of lithium tetrafluoroborate (LiBF$_4$) was dissolved, whereby an electrolyte was obtained. The measured ionic conductivity and viscosity of the mixture are shown in Table 4.

Example 13

In 10 parts of the polymer obtained in Example 9, 1.4 parts of lithium trifluoromethane sulfonate (LiCF$_3$SO$_3$) was dissolved, whereby an electrolyte was obtained. The measured ionic conductivity and viscosity of the mixture are shown in Table 4.

Example 14

In 10 parts of the polymer obtained in Example 9, 0.66 parts of lithium hexafluorophosphate (LiPF$_6$) was dissolved, whereby an electrolyte was obtained. The measured ionic conductivity and viscosity of the mixture are shown in Table 4.

Example 15

In 10 parts of the polymer obtained in Example 9, 3.4 parts of lithium bispentafluoroethane sulfonylimide (Li(C$_2$F$_5$SO$_2$)$_2$N) was dissolved, whereby an electrolyte was obtained. The measured ionic conductivity and viscosity of the mixture are shown in Table 4.

Comparative Example 2

In 10 parts of polyethylene glycol (molecular weight: 10000), 1.0 part of lithium perchlorate (LiClO$_4$) was dissolved, whereby an electrolyte was obtained. The measured ionic conductivity and viscosity of the mixture are shown in Table 4. The measurement error was large under high resistance/low current at a temperature of 40° C. or lower, and stable ionic conductivity was not obtained.

In Table 4, the symbol "—" in the columns under ionic conductivity indicates that the measurement error was large and thus stable ionic conductivity was not obtained, and the symbol "/" indicates that no evaluation was made.

TABLE 4

| | | Ionic conductivity (mS/cm) | | | | | | | | |
|---|---|---|---|---|---|---|---|---|---|---|
| | | Example 8 | Example 9 | Example 10 | Example 11 | Example 12 | Example 13 | Example 14 | Example 15 | Comparative Example 2 |
| Temperature (° C.) | 60 | 3.6 | 3.7 | 4.7 | 5.0 | 0.51 | 1.5 | | 3.1 | 1.2 |
| | 40 | 1.4 | 2.1 | 2.0 | 2.2 | 0.30 | 0.79 | | 1.6 | — |
| | 25 | 0.7 | 0.9 | 0.84 | 0.87 | 0.16 | 0.38 | 0.45 | 0.80 | — |
| | 0 | 0.2 | 0.3 | 0.13 | 0.12 | — | 0.069 | 0.065 | 0.12 | — |
| | −20 | 0.02 | 0.05 | 0.01 | 0.01 | — | — | — | 0.01 | — |

Example 16

A 0.5-L flask equipped with a stirrer, a dropping opening, a thermometer, a condenser tube, and a nitrogen gas inlet was charged with 150 parts of butyl acetate, 40 parts of decaethylene glycol methyl vinyl ether, and 0.3 parts of vinyloxy ethoxy ethyl acrylate. The mixture was stirred for 10 minutes while the flask was cooled in an acetone-dry ice bath, so that the reaction solution was cooled to −5° C. A mixture (polymerization initiator) of 0.01 parts of picryl sulfonic acid and 1 part of butyl acetate was put into the flask, so that the temperature of the mixture increased by self-heating. Since the temperature of the solution did not increase any more after 15 minutes, 0.04 parts of triethylamine was added such that the mixture was neutralized. Thereby, a solution with a non-volatile content of the polymer of 21.0% was obtained. The weight average molecular weight of the obtained polymer was 12000. The polymer solution obtained thereby was condensed by a rotating evaporator, and then the volatile component was removed by a vacuum dryer. In 10 parts of the obtained polymer, 2.5 parts of LiTFSI and 0.05 parts of photo radical polymerization initiator KT046 (product of DKSH Japan) were dissolved, whereby a mixture was obtained. The obtained mixture solution was applied to an Al substrate (film thickness: 20 µm) by a 6-mil applicator. The coating film was irradiated with UV (UV-irradiation machine: light equipment URM-100 for printing, product of USHIO, INC.; UV irradiation condition: (output) 450 W, (irradiation time) 80 seconds), and a 90 µm-thick electrolyte film was obtained from the polymer composition. The measured ionic conductivity of the obtained film is shown in Table 5.

Example 17

An electrolyte film was obtained in the same manner as in Example 16, except that 1.6 parts of lithium bisfluoro sulfonylimide (LiFSI) was used instead of LiTFSI. The measured ionic conductivity of the obtained film is shown in Table 5.

Example 18

An electrolyte film was obtained in the same manner as in Example 16, except that 1.4 parts of lithium trifluoromethanesulfonate (LiCF$_3$SO$_3$) was used instead of LiTFSI. The measured ionic conductivity of the obtained film is shown in Table 5.

Example 19

An electrolyte film was obtained in the same manner as in Example 16, except that 1.1 parts of lithium tetracyanoborate (LiTCB) was used instead of LiTFSI. The measured ionic conductivity of the obtained film is shown in Table 5.

Example 20

An electrolyte film was obtained in the same manner as in Example 16, except that decaalkylene glycol methyl vinyl ether (ethylene oxide-propylene oxide copolymer) was used instead of decaethylene glycol methyl vinyl ether. The weight average molecular weight of the obtained polymer before UV irradiation was 10000. The measured ionic conductivity of the obtained film is shown in Table 5.

Comparative Example 3

An electrolyte film was obtained in the same manner as in Example 16, except that 1.0 part of lithium perchlorate (LiClO$_4$) was used instead of LiTFSI. The measured ionic conductivity of the obtained film is shown in Table 5.

In Table 5, the symbol "/" in columns under ionic conductivity indicates that no evaluation was made.

TABLE 5

| | | Ionic conductivity (mS/cm) | | | | | |
|---|---|---|---|---|---|---|---|
| | | Example 16 | Example 17 | Example 18 | Example 19 | Example 20 | Comparative Example 3 |
| Temperature (° C.) | 60 | 0.47 | 0.54 | 0.36 | 0.85 | 0.41 | 0.25 |
| | 40 | 0.19 | 0.22 | 0.19 | 0.34 | 0.17 | 0.16 |
| | 25 | 0.13 | 0.13 | 0.15 | 0.15 | 0.14 | 0.10 |
| | 20 | 0.11 | | | 0.12 | | |

The results of the examples and the comparative examples lead to the following conclusions.

The electrolyte material of the present invention includes a polymer derived from a monomer component including the monomer represented by formula (1); and an electrolyte salt including an ionic compound that includes an alkali metal cation and at least one anion selected from the group consisting of PF$_6^-$, BF$_4^-$, CF$_3$SO$_3^-$, tetracyanoborate, and R$^3$SO$_2$N$^-$SO$_2$R$^4$ wherein R$^3$ and R$^4$ are the same as or different from each other, each representing either F, CF$_3$, or C$_2$F$_5$. Such an electrolyte salt was found to exhibit favorable ionic conductivity at room temperature and higher temperatures, and also exhibit ionic conductivity at 0° C. or lower temperatures at which polyethylene glycol cannot exhibit stable ionic conductivity; that is, the electrolyte salt was found to exhibit ionic conductivity at a wide range of temperatures.

Although evaluation on electrolyte materials containing specific polymers was made in the above examples, the mechanism that the electrolyte material of the present invention exhibits excellent ionic conductivity at a wide range of temperatures is the same if the polymer is derived from a monomer component including the monomer represented by formula (1) in the present invention. Hence, the results of the examples are considered to show that the present invention is applicable in the entire technical scope of the present invention and in the various embodiments described herein, and can achieve advantageous effects.

The invention claimed is:

1. An electrolyte material comprising, as essential components thereof,
a polymer having an ether bond in a side chain thereof, and an electrolyte salt,
the polymer including a copolymer comprising a linear polymer chain which contains repeating units of the polymerized form of a monomer represented by the following formula (1) and —CH$_2$—CH— structure formed by a polymerization reaction of a vinyl group in another polymerizable monomer having a vinyl group or a homopolymer whose polymer chain consists of repeating units of the polymerized form a of a monomer represented by the following formula (1):

[Chem. 1]

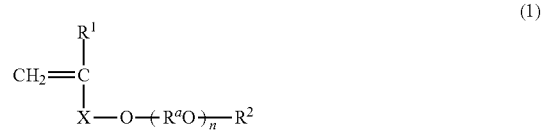

(1)

wherein R$^1$ represents a hydrogen atom or a methyl group; X represents a methylene group or a direct bond; each R$^a$ is the same as or different from each other, each representing a C1 to C4 linear or branched hydrocarbon group; R$^2$ represents a C1 to C18 aliphatic or alicyclic alkyl group, C6 to C18 aryl group, alkyl-substituted aryl group, (alkyl)phenyl-substituted aryl group or aryl-substituted alkyl group; and n represents an average number of added moles of a group represented by R$^a$O and wherein n is in the range of 1 to 50,
the electrolyte salt including an ionic compound that includes an alkali metal cation and at least one anion selected from the group consisting of PF$_6^-$, BF$_4^-$, CF$_3$SO$_3^-$, tetracyanoborate, and R$^3$SO$_2$N$^-$SO$_2$R$^4$ wherein R$^3$ and R$^4$ are the same as or different from each other, each representing either F, CF$_3$, or C$_2$F$_5$.

2. The electrolyte material according to claim 1, wherein the polymer is a cross-linkable polymer that has a cross-linkable functional group in a molecule thereof.

3. The electrolyte material according to claim 2, wherein the electrolyte material includes a cross-linked polymer that is obtained by reacting the cross-linkable functional group in the molecule of the polymer.

4. The electrolyte material according to claim 1, wherein X in formula (1) is a direct bond.

5. The electrolyte material according to claim 1, wherein X in formula (1) is a methylene group.

6. The electrolyte material according to claim 1, wherein n is in the range of 2 to 50.

7. The electrolyte material according to claim 2, wherein the cross-linkable polymer is a polymer derived from the monomer component that further includes a vinyl ether group-containing (meth)acrylate.

8. The electrolyte material according to claim 1, wherein the electrolyte material has an ionic conductivity of 10$^{-6}$ S/cm or higher at 25° C.

9. The electrolyte material according to claim 1, wherein the electrolyte material has an operating temperature range that includes 0° C. to 25° C.

10. A cell material comprising the electrolyte material according to claim 1.

11. A secondary cell comprising the cell material according to claim 10.

12. The secondary cell according to claim 11, wherein a positive electrode active material is an olivine-type lithium iron phosphate.

13. The electrolyte material according to claim 2, wherein X in formula (1) is a direct bond.

14. The electrolyte material according to claim 3, wherein X in formula (1) is a direct bond.

15. The electrolyte material according to claim 2, wherein X in formula (1) is a methylene group.

16. The electrolyte material according to claim 3, wherein X in formula (1) is a methylene group.

17. The electrolyte material according to claim 2, wherein n is in the range of 2 to 50.

18. The electrolyte material according to claim 3, wherein n is in the range of 2 to 50.

19. The electrolyte material according to claim 4, wherein n is 2 to 50.

20. The electrolyte material according to claim 5, wherein n is in the range of 2 to 50.

21. The electrolyte material according to claim 1, wherein n representing an average number of added moles for the group represented by $R^aO$ in formula (1) is any one of 4 to 50.

22. The electrolyte material according to claim 3, wherein the monomer component includes a polyfunctional monomer and the proportion of the polyfunctional monomer is 0.1% by mass or higher and 50% by mass or lower in 100% by mass of the total monomer component.

23. The electrolyte material according to claim 2, wherein the cross-linkable polymer is a radically copolymerizable polymer.

24. The electrolyte material according to claim 1, wherein the polymer prepared by polymerizing a monomer component that includes a monomer represented by the formula (1) has a weight average molecular weight of at least 8000.

* * * * *

UNITED STATES PATENT AND TRADEMARK OFFICE
CERTIFICATE OF CORRECTION

PATENT NO. : 9,065,150 B2
APPLICATION NO. : 13/514522
DATED : June 23, 2015
INVENTOR(S) : Masashi Hashimoto et al.

It is certified that error appears in the above-identified patent and that said Letters Patent is hereby corrected as shown below:

In the claims:

At column 30, claim number 1, line number 6, "polymerized form a of a" should read --polymerized form of a--;

At column 30, claim number 4, line number 53, "in formula" should read --in the formula--;

At column 30, claim number 5, line number 55, "in formula" should read --in the formula--;

At column 31, claim number 13, line number 9, "in formula" should read --in the formula--;

At column 31, claim number 14, line number 11, "in formula" should read --in the formula--;

At column 31, claim number 15, line number 13, "in formula" should read --in the formula--;

At column 31, claim number 16, line number 15, "in formula" should read --in the formula--;

At column 32, claim number 21, line number 7, "in formula" should read --in the formula--.

Signed and Sealed this
Fifteenth Day of March, 2016

Michelle K. Lee
*Director of the United States Patent and Trademark Office*